United States Patent
Muller

(10) Patent No.: US 10,878,972 B2
(45) Date of Patent: Dec. 29, 2020

(54) HAZARDOUS MATERIAL REPOSITORY SYSTEMS AND METHODS

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 0 days.

(21) Appl. No.: 16/796,787

(22) Filed: Feb. 20, 2020

(65) Prior Publication Data

US 2020/0273591 A1 Aug. 27, 2020

Related U.S. Application Data

(60) Provisional application No. 62/808,588, filed on Feb. 21, 2019, provisional application No. 62/808,545, filed on Feb. 21, 2019, provisional application No. 62/833,097, filed on Apr. 12, 2019.

(51) Int. Cl.
| | |
|---|---|
| *B09B 1/00* | (2006.01) |
| *G21F 5/008* | (2006.01) |
| *G21F 5/08* | (2006.01) |
| *G21F 9/36* | (2006.01) |

(52) U.S. Cl.
CPC .............. *G21F 5/008* (2013.01); *B09B 1/008* (2013.01); *G21F 5/08* (2013.01); *G21F 9/36* (2013.01)

(58) Field of Classification Search
CPC .............. G21F 9/36; G21F 5/08; B09B 1/008
See application file for complete search history.

(56) References Cited

U.S. PATENT DOCUMENTS

| | | | |
|---|---|---|---|
| 3,711,715 A | 1/1973 | Bochard | |
| 3,780,309 A | 12/1973 | Bochard | |
| 3,902,548 A | 9/1975 | Bochard | |
| 3,930,166 A | 12/1975 | Bochard | |
| 3,948,575 A | 4/1976 | Rosser | |

(Continued)

FOREIGN PATENT DOCUMENTS

| | | |
|---|---|---|
| EP | 2555203 | 2/2013 |
| JP | H09264992 | 10/1997 |

(Continued)

OTHER PUBLICATIONS

Wikipedia.org [online], "Metal foam," Last updated Feb. 18, 2020, retrieved Feb. 18, 2020, retrieved from URL <https://en.wikipedia.org/wiki/Metal_foam>, 10 pages.

(Continued)

*Primary Examiner* — Janine M Kreck
(74) *Attorney, Agent, or Firm* — Fish & Richardson P.C.

(57) ABSTRACT

Techniques for storing nuclear waste include placing a plurality of nuclear waste portions into an inner volume of a housing of a nuclear waste canister configured to store the nuclear waste portions in a hazardous waste repository of a directional drillhole formed in a subterranean formation; substantially filling voids within the inner volume and between the plurality of nuclear waste portions with a solid or semi-solid granular material; and sealing the inner volume of the nuclear waste canister to enclose the plurality of nuclear waste portions and the solid or semi-solid granular material.

28 Claims, 8 Drawing Sheets

(56) References Cited

U.S. PATENT DOCUMENTS

| | | | |
|---|---|---|---|
| 4,274,007 A | 6/1981 | Baatz et al. | |
| 4,320,028 A | 3/1982 | Leuchtag | |
| 4,337,167 A | 6/1982 | Bird et al. | |
| 4,625,122 A * | 11/1986 | Botzem | G21F 5/14 250/506.1 |
| 5,061,858 A * | 10/1991 | Mallory | G21F 5/00 250/506.1 |
| 5,165,235 A | 11/1992 | Nitschke | |
| 5,199,488 A | 4/1993 | Kasevich et al. | |
| 5,314,264 A | 5/1994 | Danko et al. | |
| 5,340,235 A | 8/1994 | Milliken | |
| 5,377,104 A | 12/1994 | Sorrells et al. | |
| 5,387,741 A * | 2/1995 | Shuttle | B09B 1/008 405/129.57 |
| 5,464,988 A * | 11/1995 | Rossmassler | G21F 5/002 250/507.1 |
| 5,489,739 A | 2/1996 | Curry et al. | |
| 5,786,611 A | 7/1998 | Quapp et al. | |
| 5,835,548 A | 10/1998 | Lindgren et al. | |
| 5,832,392 A | 11/1998 | Forsberg | |
| 5,850,614 A | 12/1998 | Crichlow | |
| 5,863,283 A | 1/1999 | Gardes | |
| 5,920,602 A * | 7/1999 | Botzem | E21F 17/02 376/272 |
| 6,109,355 A * | 8/2000 | Reid | E21B 17/07 166/242.7 |
| 6,114,710 A | 9/2000 | Contrepois et al. | |
| 6,238,138 B1 | 5/2001 | Crichlow | |
| 6,366,633 B1 | 4/2002 | Stezaly et al. | |
| 6,372,157 B1 | 4/2002 | Krill et al. | |
| 6,699,439 B1 | 3/2004 | Dannert et al. | |
| 6,784,443 B2 | 8/2004 | Pennington et al. | |
| 6,853,697 B2 | 2/2005 | Singh et al. | |
| 6,889,108 B2 | 5/2005 | Tanaka et al. | |
| 6,925,138 B2 | 8/2005 | Nakamaru et al. | |
| 7,068,748 B2 | 6/2006 | Singh | |
| 7,287,934 B2 | 10/2007 | Okutsu et al. | |
| 7,330,526 B2 | 2/2008 | Singh | |
| 7,590,213 B1 | 9/2009 | Singh | |
| 7,781,637 B2 | 8/2010 | Russell et al. | |
| 7,786,456 B2 | 8/2010 | Singh et al. | |
| 7,933,374 B2 | 4/2011 | Singh | |
| 8,003,966 B2 | 8/2011 | Temus et al. | |
| 8,098,790 B2 | 1/2012 | Singh | |
| 8,135,107 B2 | 3/2012 | Singh et al. | |
| 8,342,357 B1 | 1/2013 | Grubb et al. | |
| 8,351,562 B2 | 1/2013 | Singh | |
| 8,437,444 B2 | 5/2013 | Pennington et al. | |
| 8,561,318 B2 | 10/2013 | Singh et al. | |
| 8,576,976 B2 | 11/2013 | Singh et al. | |
| 8,625,732 B2 | 1/2014 | Singh | |
| 8,630,384 B2 | 1/2014 | Carver et al. | |
| 8,657,549 B2 | 2/2014 | Grubb et al. | |
| 8,737,559 B2 | 5/2014 | Singh | |
| 8,798,224 B2 | 8/2014 | Singh | |
| 8,929,504 B2 | 1/2015 | Singh et al. | |
| 8,933,289 B2 | 1/2015 | Crichlow | |
| 9,349,493 B2 | 5/2016 | Bracey et al. | |
| 9,396,824 B2 | 7/2016 | Agace | |
| 9,442,037 B2 | 9/2016 | Agace | |
| 9,443,625 B2 | 9/2016 | Singh | |
| 9,514,853 B2 | 12/2016 | Singh et al. | |
| 9,558,857 B2 | 1/2017 | Subiry | |
| 9,640,289 B2 | 5/2017 | Springman et al. | |
| 9,672,948 B2 | 6/2017 | Singh | |
| 9,724,790 B2 | 8/2017 | Grubb et al. | |
| 9,748,009 B2 | 8/2017 | Singh | |
| 9,761,338 B2 | 9/2017 | Singh | |
| 9,779,843 B2 | 10/2017 | Singh et al. | |
| 9,831,005 B2 | 11/2017 | Singh | |
| 9,833,819 B2 | 12/2017 | Burget | |
| 9,852,822 B2 | 12/2017 | Singh | |
| 9,916,911 B2 | 3/2018 | Singh | |
| 10,002,683 B2 | 6/2018 | Muller et al. | |
| 10,008,299 B2 | 6/2018 | Wellwood et al. | |
| 10,020,084 B2 | 7/2018 | Lehnert et al. | |
| 10,032,533 B2 | 7/2018 | Carver et al. | |
| 10,037,826 B2 | 7/2018 | Singh et al. | |
| 10,049,777 B2 | 8/2018 | Singh | |
| 10,115,490 B1 | 10/2018 | Downey | |
| 10,147,509 B2 | 12/2018 | Singh | |
| 10,217,537 B2 | 2/2019 | Agace | |
| 10,229,764 B2 | 3/2019 | Singh et al. | |
| 10,265,743 B1 | 4/2019 | Muller et al. | |
| 10,297,356 B2 | 5/2019 | Springman et al. | |
| 10,311,987 B2 | 6/2019 | Singh et al. | |
| 10,332,642 B2 | 6/2019 | Singh | |
| 10,373,722 B2 | 8/2019 | Singh | |
| 10,410,756 B2 | 9/2019 | Singh | |
| 10,427,191 B2 | 10/2019 | Crichlow | |
| 10,438,710 B2 | 10/2019 | Subiry | |
| 10,446,287 B2 | 10/2019 | Singh | |
| 10,692,618 B2 | 6/2020 | Muller | |
| 2001/0032851 A1 | 10/2001 | Pennington et al. | |
| 2002/0020528 A1 | 2/2002 | McCabe et al. | |
| 2003/0165649 A1 * | 9/2003 | Reich | B09B 1/008 428/36.91 |
| 2004/0109523 A1 | 6/2004 | Singh et al. | |
| 2005/0117687 A1 | 6/2005 | Carver et al. | |
| 2005/0207525 A1 | 9/2005 | Singh | |
| 2005/0220257 A1 | 10/2005 | Singh | |
| 2006/0215803 A1 | 9/2006 | Singh | |
| 2008/0069291 A1 | 3/2008 | Singh et al. | |
| 2008/0073601 A1 | 3/2008 | Temus et al. | |
| 2009/0158614 A1 | 6/2009 | Singh et al. | |
| 2009/0159550 A1 | 6/2009 | Singh et al. | |
| 2009/0252274 A1 | 10/2009 | Singh | |
| 2010/0105975 A1 | 4/2010 | Baird | |
| 2010/0254785 A1 | 10/2010 | Grubb et al. | |
| 2010/0272225 A1 | 10/2010 | Singh | |
| 2010/0284506 A1 | 11/2010 | Singh | |
| 2011/0005762 A1 | 1/2011 | Poole | |
| 2011/0021859 A1 | 1/2011 | Singh | |
| 2011/0255647 A1 | 10/2011 | Singh | |
| 2012/0083644 A1 | 4/2012 | Singh | |
| 2013/0068482 A1 * | 3/2013 | Fay | E21B 40/00 166/382 |
| 2013/0070885 A1 | 3/2013 | Singh et al. | |
| 2013/0112408 A1 | 5/2013 | Oxtoby | |
| 2013/0163710 A1 | 6/2013 | Singh | |
| 2013/0322589 A1 | 12/2013 | Bracey et al. | |
| 2013/0340225 A1 | 12/2013 | Grubb et al. | |
| 2014/0034875 A1 * | 2/2014 | Nakarai | G21F 9/36 252/194 |
| 2014/0039235 A1 | 2/2014 | Subiry | |
| 2014/0047733 A1 | 2/2014 | Singh et al. | |
| 2014/0177776 A1 | 6/2014 | Singh | |
| 2014/0192946 A1 | 7/2014 | Singh | |
| 2014/0219408 A1 | 8/2014 | Singh | |
| 2014/0270043 A1 | 9/2014 | Lehnert et al. | |
| 2014/0317952 A1 | 10/2014 | Singh | |
| 2014/0329455 A1 | 11/2014 | Singh | |
| 2014/0341330 A1 | 11/2014 | Singh | |
| 2015/0069274 A1 | 3/2015 | Agace | |
| 2015/0071398 A1 | 3/2015 | Singh | |
| 2015/0092904 A1 | 4/2015 | Carver et al. | |
| 2015/0211954 A1 | 7/2015 | Agace | |
| 2015/0340112 A1 | 11/2015 | Singh et al. | |
| 2015/0357066 A1 | 12/2015 | Singh | |
| 2016/0027538 A1 | 1/2016 | Singh et al. | |
| 2016/0118152 A1 | 4/2016 | Singh et al. | |
| 2016/0163404 A9 | 6/2016 | Singh | |
| 2016/0196887 A1 | 7/2016 | Singh et al. | |
| 2016/0203884 A1 | 7/2016 | Springman et al. | |
| 2016/0365163 A1 | 12/2016 | Singh | |
| 2017/0110209 A1 | 4/2017 | Subiry | |
| 2017/0110210 A1 | 4/2017 | Singh | |
| 2017/0236605 A1 | 8/2017 | Springman et al. | |
| 2017/0301425 A1 | 10/2017 | Wellwood et al. | |
| 2017/0365367 A1 | 12/2017 | Lee et al. | |
| 2018/0005717 A1 | 1/2018 | Singh et al. | |
| 2018/0005718 A1 | 1/2018 | Singh | |
| 2018/0025800 A1 | 1/2018 | Singh | |

(56) References Cited

U.S. PATENT DOCUMENTS

| | | | |
|---|---|---|---|
| 2018/0053574 A1 | 2/2018 | Singh | |
| 2018/0061515 A1 | 3/2018 | Singh | |
| 2018/0144841 A1 | 5/2018 | Singh | |
| 2018/0190401 A1 | 7/2018 | Singh | |
| 2018/0216458 A1 | 8/2018 | Garcia et al. | |
| 2018/0240560 A1* | 8/2018 | Liu | G21F 5/005 |
| 2018/0277273 A1 | 9/2018 | Singh et al. | |
| 2018/0290188 A1* | 10/2018 | Crichlow | G21F 9/301 |
| 2018/0301231 A1 | 10/2018 | Singh et al. | |
| 2018/0308594 A1 | 10/2018 | Carver et al. | |
| 2018/0322970 A1 | 11/2018 | Singh et al. | |
| 2018/0345336 A1 | 12/2018 | Muller et al. | |
| 2019/0066858 A1 | 2/2019 | Sisley et al. | |
| 2019/0099790 A1 | 4/2019 | Muller et al. | |
| 2019/0103197 A1 | 4/2019 | Singh et al. | |
| 2019/0139661 A1 | 5/2019 | Singh | |
| 2019/0295735 A1* | 9/2019 | Crichlow | G21F 9/36 |
| 2019/0326028 A1 | 10/2019 | Singh | |
| 2019/0348186 A1 | 11/2019 | Singh | |
| 2020/0027607 A1 | 1/2020 | Muller et al. | |

FOREIGN PATENT DOCUMENTS

| | | |
|---|---|---|
| JP | 2004011708 | 1/2004 |
| JP | 2004-205503 | 7/2004 |
| WO | WO 1992007667 | 5/1992 |
| WO | WO 2015069300 | 5/2015 |
| WO | WO 2016177876 | 11/2016 |
| WO | WO 2018-157024 | 8/2018 |
| WO | WO 2019236535 | 12/2019 |

OTHER PUBLICATIONS

[No Author Listed], "A Report to the U.S. Congress and the Secretary of Energy—Evaluation of Technical Issues Associated With the Development of a Separate Repository for U.S. Department of Energy—Managed High-Level Radioactive Waste and Spent Nuclear Fuel," U.S. Nuclear Waste Technical Review Board, Jun. 2015, 30 pages.

[No Author Listed], "Yucca Mountain cost estimate rises to $96 billion," World Nuclear News, Aug. 6, 2008, 2 pages, ISSN 2040-5766.

Arnold et al., "Reference Design and Operations of Deep Borehole Disposal of High-Level Radioactive Waste," Sandia National Laboratories, Sandia Report, Oct. 2011, retrieved from: URL<http://prod.sandia.gov/techlib/access-control.cgi/2011/116749.pdf>, 67 pages.

Cornwall, W., "Deep Sleep, Boreholes drilled into Earth's crust get a fresh look for nuclear waste disposal," Science, Jul. 2015, 349(6244): 132-135.

Dozier, "Feasibility of Very Deep Borehole Disposal of US Nuclear Defense Wastes," Submitted to the Department of Nuclear Science and Engineering in Partial Fulfillment of the Requirements for the Degree of Master of Science in Nuclear Science and Engineering at the Massachusetts Institute of Technology, Sep. 2011, 12 pages.

Faybishenko et al., Editors, Lawrence Berkeley National Laboratory and Sandia National Laboratories, "International Approaches for Deep Geological Disposal of Nuclear Waste: Geological Challenges in Radioactive Waste Isolation", prepared for the US Department of Energy, Fifth Worldwide Review, Dec. 2016, 474 pages.

Gibb et al., "A model for heat flow in deep borehole disposals of high-level nuclear waste," Journal of Geophysical Research, May 2008, 113(B05201), 18 pages.

Gibbs, "Feasibility of lateral emplacement in very deep borehole disposal of high level nuclear waste" Master's thesis, Massachusetts Institute of Technology, 2010, 2 pages (Abstract Only).

Hoag, "Canister Design for Deep Borehole Disposal of Nuclear Waste," Massachusetts Institute of Technology, May 2006, pp. 1-6.

Neuzil [online], "Shale: an overlooked option for US nuclear waste disposal," Bulletin of the Atomic Scientists, Nov. 2014, [Retrieved on Aug. 23, 2018], retrieved from: <http://thebulletin .org/shale-overlooked-option-us-nuclear-waste-disposal7831>, 5 pages.

Neuzil, "Can Shale Safely Host U.S. Nuclear Waste?," EOS, Transactions, American Geophysical Union, Jul. 2013, 94(30):261-268.

Sone et al., "Mechanical properties of shale-gas reservoir rocks—Part 1: Static and dynamic elastic properties and anisotropy," GEOPHYSICS, Oct. 2013, 78(5):D381-D392.

Vartabedian [online], "Decades-old war over Yucca Mountain nuclear dump resumes under Trump budget plan," Los Angeles Times, Mar. 2017, [Retrieved on Sep. 2, 2020], retrieved from: URL<https://www.latimes.com/local/california/la-na-yucca-revival-20170329-story.html>, 12 pages.

Winterle et al., "Regulatory Perspectives on Deep Borehole Disposal Concepts," prepared for the U.S. Nuclear Regulatory Commission, Contract NRC-02-07-006, Center for Nuclear Waste Regulatory Analyses, San Antonio, TX, May 2011, 24 pages.

YuccaMountain.org [online], FAQ's, Eureka County, Nevada—Nuclear Waste Office, Eureka County Home, Updated on Mar. 17, 2017, retrieved from: URL<https://www.yuccamountain.org/faq.htm>, 12 pages.

PCT International Search Report and Written Opinion in International Appln. No. PCT/US2020/019218, dated Jun. 19, 2020, 9 pages.

Bates, "A Drop-In Concept for Deep Borehole Canister Emplacement," Submitted to the Department of Nuclear Science and Engineering, Massachusetts Institute of Technology, Jun. 2011, 128 pages.

\* cited by examiner

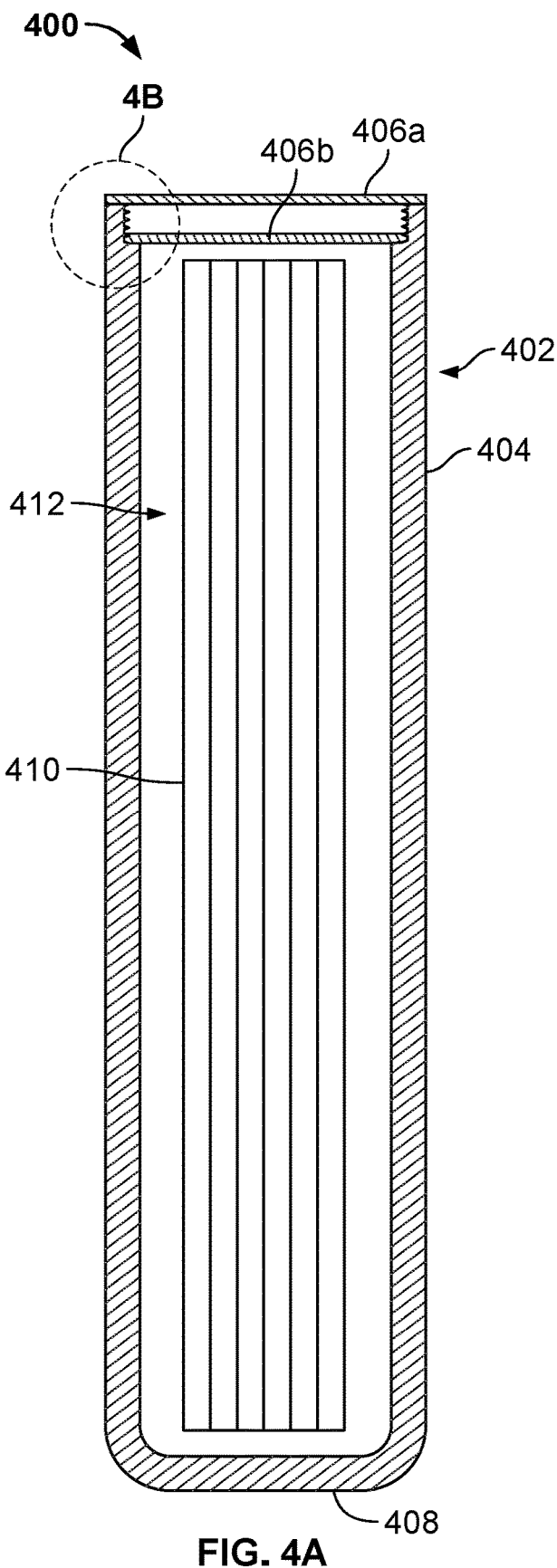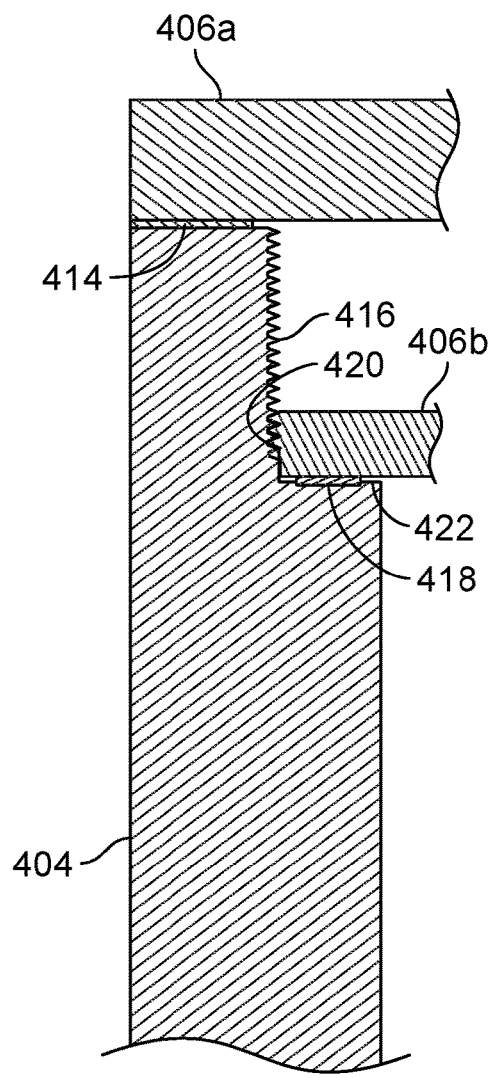
FIG. 4A
FIG. 4B

HAZARDOUS MATERIAL REPOSITORY SYSTEMS AND METHODS

CROSS-REFERENCE TO RELATED APPLICATIONS

This application claims priority under 35 U.S.C. § 119 to: U.S. Provisional Patent Application Ser. No. 62/808,588, filed on Feb. 21, 2019; U.S. Provisional Patent Application Ser. No. 62/808,545, filed on Feb. 21, 2019; and U.S. Provisional Patent Application Ser. No. 62/833,097, filed on Apr. 12, 2019. The entire contents of each of the previous applications are incorporated by reference herein.

TECHNICAL FIELD

This disclosure relates to hazardous material repository systems and methods.

BACKGROUND

Hazardous material, such as radioactive waste, is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even high-grade military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the *Yucca* Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In a general implementation, a nuclear waste canister includes a housing that at least partially defines an inner volume sized to enclose a plurality of nuclear waste portions and configured to store the nuclear waste portions in a hazardous waste repository of a directional drillhole formed in a subterranean formation; and a solid or semi-solid granular material enclosed in the inner volume of the housing that at least substantially fills voids within the inner volume and between the plurality of nuclear waste portions.

In an aspect combinable with the general implementation, the nuclear waste portions include a plurality of spent nuclear fuel (SNF) rods of an SNF assembly.

In another aspect combinable with any of the previous aspects, the inner volume is sized to store a single SNF assembly.

In another aspect combinable with any of the previous aspects, the solid or semi-solid granular material includes a solid powder.

In another aspect combinable with any of the previous aspects, the solid powder includes silicon-dioxide.

In another aspect combinable with any of the previous aspects, the solid or semi-solid granular material includes a neutron-absorbing material.

Another aspect combinable with any of the previous aspects further includes an impact absorber positioned within the inner volume or on an exterior surface of the housing.

In another aspect combinable with any of the previous aspects, the impact absorber includes a crushable member or spring member.

In another aspect combinable with any of the previous aspects, the impact absorber includes a low-corrosion material.

Another aspect combinable with any of the previous aspects further includes a friction brake mounted to an end of the housing.

In another aspect combinable with any of the previous aspects, the friction brake is mounted to the housing with a pivotable or rotatable connection.

In another aspect combinable with any of the previous aspects, the end of the housing includes a downhole end of the housing.

In another aspect combinable with any of the previous aspects, the friction brake includes a surface configured to contact a casing installed in the directional drillhole.

In another general implementation, a method for storing nuclear waste includes placing a plurality of nuclear waste portions into an inner volume of a housing of a nuclear waste canister configured to store the nuclear waste portions in a hazardous waste repository of a directional drillhole formed in a subterranean formation; substantially filling voids within the inner volume and between the plurality of nuclear waste portions with a solid or semi-solid granular material; and sealing the inner volume of the nuclear waste canister to enclose the plurality of nuclear waste portions and the solid or semi-solid granular material.

In an aspect combinable with the general implementation, the nuclear waste portions include a plurality of spent nuclear fuel (SNF) rods of an SNF assembly.

In another aspect combinable with any of the previous aspects, the inner volume is sized to store a single SNF assembly.

In another aspect combinable with any of the previous aspects, the solid or semi-solid granular material includes a solid powder.

In another aspect combinable with any of the previous aspects, the solid powder includes silicon-dioxide.

In another aspect combinable with any of the previous aspects, the solid or semi-solid granular material includes a neutron-absorbing material.

In another aspect combinable with any of the previous aspects, the nuclear waste canister further includes an impact absorber positioned within the inner volume or on an exterior surface of the housing.

In another aspect combinable with any of the previous aspects, the impact absorber includes a crushable member or spring member.

In another aspect combinable with any of the previous aspects, the impact absorber includes a low-corrosion material.

In another aspect combinable with any of the previous aspects, the nuclear waste canister further includes a friction brake mounted to an end of the housing.

In another aspect combinable with any of the previous aspects, the friction brake is mounted to the housing with a pivotable or rotatable connection.

In another aspect combinable with any of the previous aspects, the end of the housing includes a downhole end of the housing.

In another aspect combinable with any of the previous aspects, the friction brake includes a surface configured to contact a casing installed in the directional drillhole.

Another aspect combinable with any of the previous aspects further includes moving the sealed nuclear waste canister into the hazardous waste repository of the directional drillhole.

Another aspect combinable with any of the previous aspects further includes mitigating an impact of the sealed nuclear waste canister during a free fall event during movement of the sealed nuclear waste canister through the directional drillhole.

Implementations of a hazardous material storage repository according to the present disclosure may include one or more of the following features. For example, a hazardous material storage repository according to the present disclosure may allow for multiple levels of containment of hazardous material within a storage repository located thousands of feet underground, decoupled from any nearby mobile water. As another example, implementations of a hazardous material canister according to the present disclosure may withstand or reduce collisions within a directional drillhole with other objects, including other canisters, to reduce leakage of hazardous material due to such collisions. As another example, implementations of a hazardous material canister according to the present disclosure may be more easily and efficiently loaded with radioactive waste, e.g., without requiring such loading to be completed wholly within a hot room. As another example, a hazardous material storage repository according to the present disclosure may be constructed such that a free-falling hazardous material canister does not damage itself or other objects within a directional drillhole even independently of a construction of the canister, itself.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4B are schematic illustrations of another example implementation of a hazardous material canister according to the present disclosure.

DETAILED DESCRIPTION

Figure 1:
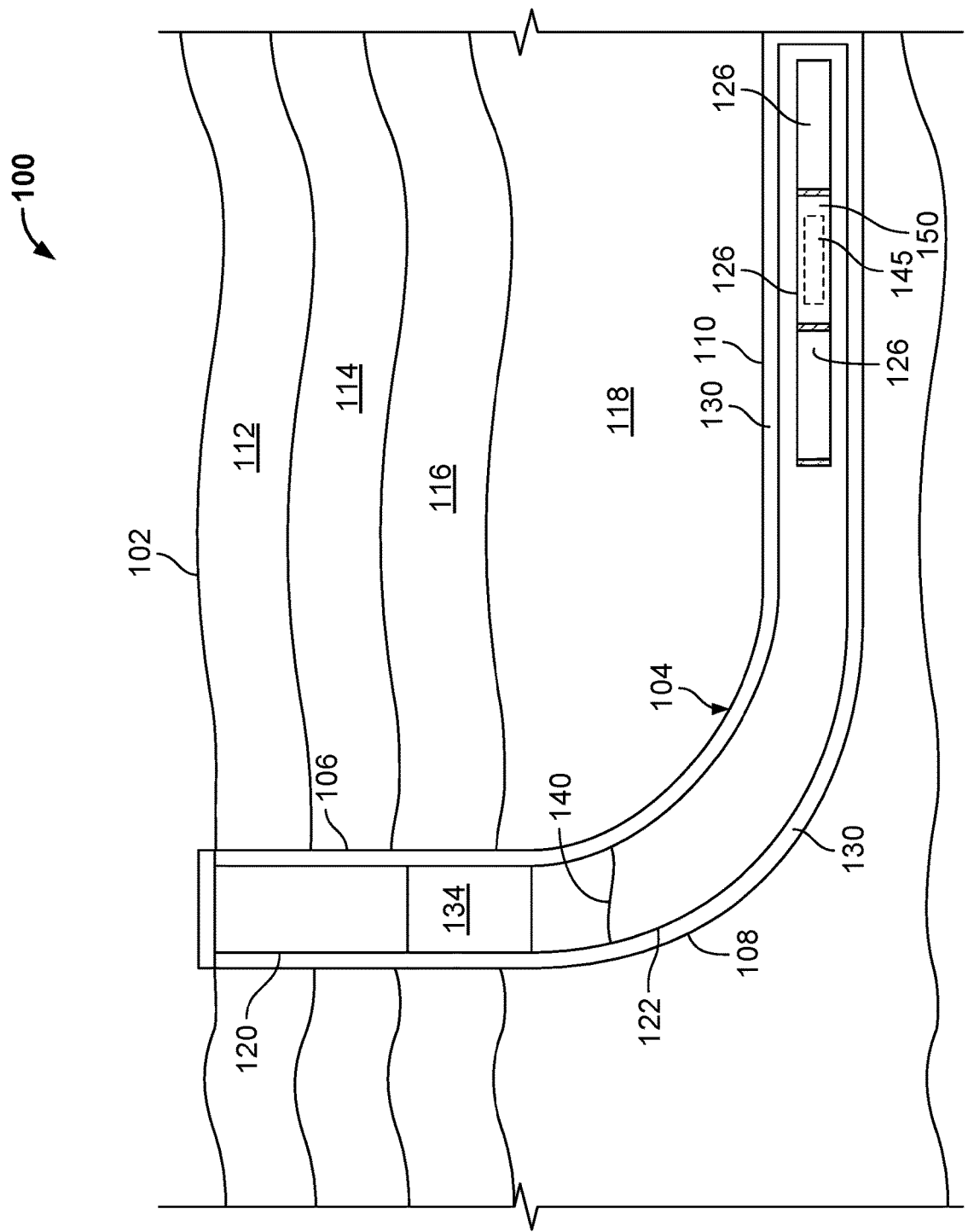
FIG. 1 is a schematic illustration of an example implementation of a hazardous material storage repository that includes one or more hazardous material canisters according to the present disclosure.

FIG. 1 is a schematic illustration of an example implementation of a hazardous material storage repository system 100, e.g., a subterranean location for the long-term (e.g., tens, hundreds, or thousands of years or more), but retrievable, safe and secure storage of hazardous material (e.g., radioactive material, such as nuclear waste which can be spent nuclear fuel (SNF) or high level waste, as two examples). For example, this figure illustrates the example hazardous material storage repository system 100 once one or more canisters 126 of hazardous material have been deployed in a subterranean formation 118. As illustrated, the hazardous material storage repository system 100 includes a drillhole 104 formed (e.g., drilled or otherwise) from a terranean surface 102 and through multiple subterranean layers 112, 114, 116, and 118. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a directional drillhole in this example of hazardous material storage repository system 100. For instance, the drillhole 104 includes a substantially vertical portion 106 coupled to a radiussed or curved portion 108, which in turn is coupled to a substantially horizontal portion 110. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102), or exactly inclined at a particular incline angle relative to the terranean surface 102. In other words, vertical drillholes often undulate offset from a true vertical direction, that they might be drilled at an angle that deviates from true vertical, and inclined drillholes often undulate offset from a true incline angle. Further, in some aspects, an inclined drillhole may not have or exhibit an exactly uniform incline (e.g., in degrees) over a length of the drillhole. Instead, the incline of the drillhole may vary over its length (e.g., by 1-5 degrees). As illustrated in this example, the three portions of the drillhole 104—the vertical portion 106, the radiussed portion 108, and the horizontal portion 110—form a continuous drillhole 104 that extends into the Earth. As used in the present disclosure, the drillhole 104 (and drillhole portions described) may also be called wellbores. Thus, as used in the present disclosure, drillhole and wellbore are largely synonymous and refer to bores formed through one or more subterranean formations that are not suitable for human-occupancy (i.e., are too small in diameter for a human to fit there within).

The illustrated drillhole 104, in this example, has a surface casing 120 positioned and set around the drillhole 104 from the terranean surface 102 into a particular depth in the Earth. For example, the surface casing 120 may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous material storage repository system 100, the surface casing 120 extends from the terranean surface through a surface layer 112. The surface layer 112, in this example, is a geologic layer comprised of one or more layered rock formations. In some aspects, the surface layer 112 in this example may or may not include freshwater aquifers, salt water or brine sources, or other sources of mobile water (e.g., water that moves through a geologic formation). In some aspects, the surface casing 120 may isolate the drillhole 104 from such mobile water, and may also provide a hanging location for other casing strings to be installed in the drillhole 104. Further, although not shown, a conductor casing may be set above the surface casing 120 (e.g., between the surface casing 120 and the surface 102 and within the surface layer 112) to prevent drilling fluids from escaping into the surface layer 112.

As illustrated, a production casing 122 is positioned and set within the drillhole 104 downhole of the surface casing 120. Although termed a "production" casing, in this example, the casing 122 may or may not have been subject to hydrocarbon production operations. Thus, the casing 122 refers to and includes any form of tubular member that is set (e.g., cemented) in the drillhole 104 downhole of the surface casing 120. In some examples of the hazardous material storage repository system 100, the production casing 122 may begin at an end of the radiussed portion 108 and extend throughout the horizontal portion 110. The casing 122 could also extend into the radiussed portion 108 and into the vertical portion 106.

As shown, cement 130 is positioned (e.g., pumped) around the casings 120 and 122 in an annulus between the casings 120 and 122 and the drillhole 104. The cement 130, for example, may secure the casings 120 and 122 (and any other casings or liners of the drillhole 104) through the subterranean layers under the terranean surface 102. In some aspects, the cement 130 may be installed along the entire length of the casings (e.g., casings 120 and 122 and any other casings), or the cement 130 could be used along certain portions of the casings if adequate for a particular drillhole 104. The cement 130 can also provide an additional layer of confinement for the hazardous material in canisters 126.

The drillhole 104 and associated casings 120 and 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 120 may extend down to about 2500 feet TVD, with a diameter of between about 22 in. and 48 in. An intermediate casing (not shown) between the surface casing 120 and production casing 122 may extend down to about 8000 feet TVD, with a diameter of between about 16 in. and 36 in. The production casing 122 may extend inclinedly (e.g., to case the horizontal portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (112, 114, 116, and 118), particular drilling techniques, as well as a size, shape, or design of a hazardous material canister 126 that contains hazardous material to be deposited in the hazardous material storage repository system 100. In some alternative examples, the production casing 122 (or other casing in the drillhole 104) could be circular in cross-section, elliptical in cross-section, or some other shape.

As illustrated, the vertical portion 106 of the drillhole 104 extends through subterranean layers 112, 114, and 116, and, in this example, lands in a subterranean layer 118. As discussed above, the surface layer 112 may or may not include mobile water. In this example, a mobile water layer 114 is below the surface layer 112 (although surface layer 112 may also include one or more sources of mobile water or liquid). For instance, mobile water layer 114 may include one or more sources of mobile water, such as freshwater aquifers, salt water or brine, or other source of mobile water. In this example of hazardous material storage repository system 100, mobile water may be water that moves through a subterranean layer based on a pressure differential across all or a part of the subterranean layer. For example, the mobile water layer 114 may be a permeable geologic formation in which water freely moves (e.g., due to pressure differences or otherwise) within the layer 114. In some aspects, the mobile water layer 114 may be a primary source of human-consumable water in a particular geographic area. Examples of rock formations of which the mobile water layer 114 may be composed include porous sandstones and limestones, among other formations.

Other illustrated layers, such as the impermeable layer 116 and the storage layer 118, may include immobile water. Immobile water, in some aspects, is water (e.g., fresh, salt, brine), that is not fit for human or animal consumption, or both. Immobile water, in some aspects, may be water that, by its motion through the layers 116 or 118 (or both), cannot reach the mobile water layer 114, terranean surface 102, or both, within 10,000 years or more (such as to 1,000,000 years).

Below the mobile water layer 114, in this example implementation of hazardous material storage repository system 100, is an impermeable layer 116. The impermeable layer 116, in this example, may not allow mobile water to pass through. Thus, relative to the mobile water layer 114, the impermeable layer 116 may have low permeability, e.g., on the order of nanodarcy permeability. Additionally, in this example, the impermeable layer 116 may be a relatively non-ductile (i.e., brittle) geologic formation. One measure of non-ductility is brittleness, which is the ratio of compressive stress to tensile strength. In some examples, the brittleness of the impermeable layer 116 may be between about 20 MPa and 40 MPa.

As shown in this example, the impermeable layer 116 is shallower (e.g., closer to the terranean surface 102) than the storage layer 118. In this example rock formations of which the impermeable layer 116 may be composed include, for example, certain kinds of sandstone, mudstone, clay, and slate that exhibit permeability and brittleness properties as described above. In alternative examples, the impermeable layer 116 may be deeper (e.g., further from the terranean surface 102) than the storage layer 118. In such alternative examples, the impermeable layer 116 may be composed of an igneous rock, such as granite.

Below the impermeable layer 116 is the storage layer 118. The storage layer 118, in this example, may be chosen as the landing for the horizontal portion 110, which stores the hazardous material, for several reasons. Relative to the impermeable layer 116 or other layers, the storage layer 118 may be thick, e.g., between about 100 and 200 feet of total vertical thickness. Thickness of the storage layer 118 may allow for easier landing and directional drilling, thereby allowing the horizontal portion 110 to be readily emplaced within the storage layer 118 during constructions (e.g., drilling). If formed through an approximate horizontal center of the storage layer 118, the horizontal portion 110 may be surrounded by about 50 to 100 feet of the geologic formation that comprises the storage layer 118. Further, the storage layer 118 may also have only immobile water, e.g., due to a very low permeability of the layer 118 (e.g., on the order of milli- or nanodarcys). In addition, the storage layer 118 may have sufficient ductility, such that a brittleness of the rock formation that comprises the layer 118 is between about 3 MPa and 10 MPa. Examples of rock formations of which the storage layer 118 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 114.

In some examples implementations of the hazardous material storage repository system 100, the storage layer 118 (and/or the impermeable layer 116) is composed of shale. Shale, in some examples, may have properties that fit within those described above for the storage layer 118. For example, shale formations may be suitable for a long-term confinement of hazardous material (e.g., in the hazardous material canisters 126), and for their isolation from mobile water layer 114 (e.g., aquifers) and the terranean surface 102. Shale formations may be found relatively deep in the Earth, typically 3000 feet or greater, and placed in isolation below any fresh water aquifers. Other formations may include salt or other impermeable formation layer.

Shale formations (or salt or other impermeable formation layers), for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of substantial fractions of such fluids into surrounding layers (e.g., mobile water layer 114). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

In some aspects, the formation of the storage layer 118 and/or the impermeable layer 116 may form a leakage barrier, or barrier layer to fluid leakage that may be determined, at least in part, by the evidence of the storage capacity of the layer for hydrocarbons or other fluids (e.g., carbon dioxide) for hundreds of years, thousands of years, tens of thousands of years, hundreds of thousands of years, or even millions of years. For example, the barrier layer of the storage layer 118 and/or impermeable layer 116 may be defined by a time constant for leakage of the hazardous material more than 10,000 years (such as between about 10,000 years and 1,000,000 years) based on such evidence of hydrocarbon or other fluid storage.

Shale (or salt or other impermeable layer) formations may also be at a suitable depth, e.g., between 3000 and 12,000 feet TVD. Such depths are typically below ground water aquifer (e.g., surface layer 112 and/or mobile water layer 114). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 116). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., dolomite or otherwise). For example, rock formations in the impermeable layer 116 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 112, 114, 116, and 118. For example, there may be repeating patterns (e.g., vertically), of one or more of the mobile water layer 114, impermeable layer 116, and storage layer 118. Further, in some instances, the storage layer 118 may be directly adjacent (e.g., vertically) the mobile water layer 114, i.e., without an intervening impermeable layer 116. In some examples, all or portions of the radiussed drillhole 108 and the horizontal drillhole 110 may be formed below the storage layer 118, such that the storage layer 118 (e.g., shale or other geologic formation with characteristics as described herein) is vertically positioned between the horizontal drillhole 110 and the mobile water layer 114.

In this example, the horizontal portion 110 of the drillhole 104 includes a storage area in a distal part of the portion 110 into which hazardous material may be retrievably placed for long-term storage. For example, a work string (e.g., tubing, coiled tubing, wireline, or otherwise) or other downhole conveyance (e.g., tractor) may be moved into the cased drillhole 104 to place one or more (three shown but there may be more or less) hazardous material canisters 126 into long term, but in some aspects, retrievable, storage in the portion 110.

Each canister 126 may enclose hazardous material (shown as material 145). Such hazardous material, in some examples, may be biological or chemical waste or other biological or chemical hazardous material. In some examples, the hazardous material may include nuclear material, such as SNF recovered from a nuclear reactor (e.g., commercial power or test reactor) or military nuclear material. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life). Other hazardous material 145 may include, for example, radioactive liquid, such as radioactive water from a commercial power (or other) reactor.

In some aspects, the storage layer 118 should be able to contain any radioactive output (e.g., gases) within the layer 118, even if such output escapes the canisters 126. For example, the storage layer 118 may be selected based on diffusion times of radioactive output through the layer 118. For example, a minimum diffusion time of radioactive output escaping the storage layer 118 may be set at, for example, fifty times a half-life for any particular component of the nuclear fuel pellets. Fifty half-lives as a minimum diffusion time would reduce an amount of radioactive output by a factor of $1 \times 10^{15}$. As another example, setting a minimum diffusion time to thirty half-lives would reduce an amount of radioactive output by a factor of one billion.

For example, plutonium-239 is often considered a dangerous waste product in SNF because of its long half-life of 24,100 years. For this isotope, 50 half-lives would be 1.2 million years. Plutonium-239 has low solubility in water, is not volatile, and as a solid, its diffusion time is exceedingly small (e.g., many millions of years) through a matrix of the rock formation that comprises the illustrated storage layer 118 (e.g., shale or other formation). The storage layer 118, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

In some aspects, the drillhole 104 may be formed for the primary purpose of long-term storage of hazardous materials. In alternative aspects, the drillhole 104 may have been previously formed for the primary purpose of hydrocarbon production (e.g., oil, gas). For example, storage layer 118 may be a hydrocarbon bearing formation from which hydrocarbons were produced into the drillhole 104 and to the terranean surface 102. In some aspects, the storage layer 118 may have been hydraulically fractured prior to hydrocarbon production. Further in some aspects, the production casing 122 may have been perforated prior to hydraulic fracturing. In such aspects, the production casing 122 may be patched (e.g., cemented) to repair any holes made from the perforating process prior to a deposit operation of hazardous material. In addition, any cracks or openings in the cement between the casing and the drillhole can also be filled at that time.

As further shown in FIG. 1, a backfill material 140 may be positioned or circulated into the drillhole 104. In this example, the backfill material 140 surrounds the canisters 126 and may have a level that extends uphole to at or near a drillhole seal 134 (e.g., permanent packer, plug, or other seal). In some aspects, the backfill material 140 may absorb radioactive energy (e.g., gamma rays or other energy). In some aspects, the backfill material 140 may have a relatively low thermal conductivity, thereby acting as an insulator between the canisters 126 and the casings.

As further shown in FIG. 1, another backfill material 150 may be positioned or placed within one or more of the canisters 126 to surround the hazardous material 145. In some aspects, the backfill material 150 may absorb radioactive energy (e.g., gamma rays or other energy). In some aspects, the backfill material 150 may have a relatively low thermal conductivity, thereby acting as an insulator between the hazardous material 145 and the canister 126. In some aspects, the backfill material 150 may also provide a stiffening attribute to the canister 126, e.g., reducing crushability, deformation, or other damage to the canister 126.

In some aspects, one or more of the previously described components of the system 100 may combine to form an engineered barrier of the hazardous waste material repository 100. For example, in some aspects, the engineered barrier is comprised of one, some, or all of the following components: the storage layer 118, the casing 130, the backfill material 140, the canister 126, the backfill material 150, the seal 134, and the hazardous material 145, itself. In some aspects, one or more of the engineered barrier components may act (or be engineered to act) to: prevent or reduce corrosion in the drillhole 104, prevent or reduce escape of the hazardous material 145; reduce or prevent thermal degradation of one or more of the other components; and other safety measures to ensure that the hazardous material 145 does not reach the mobile water layer 114 (or surface layer 112, including the terranean surface 102).

Figure 2:
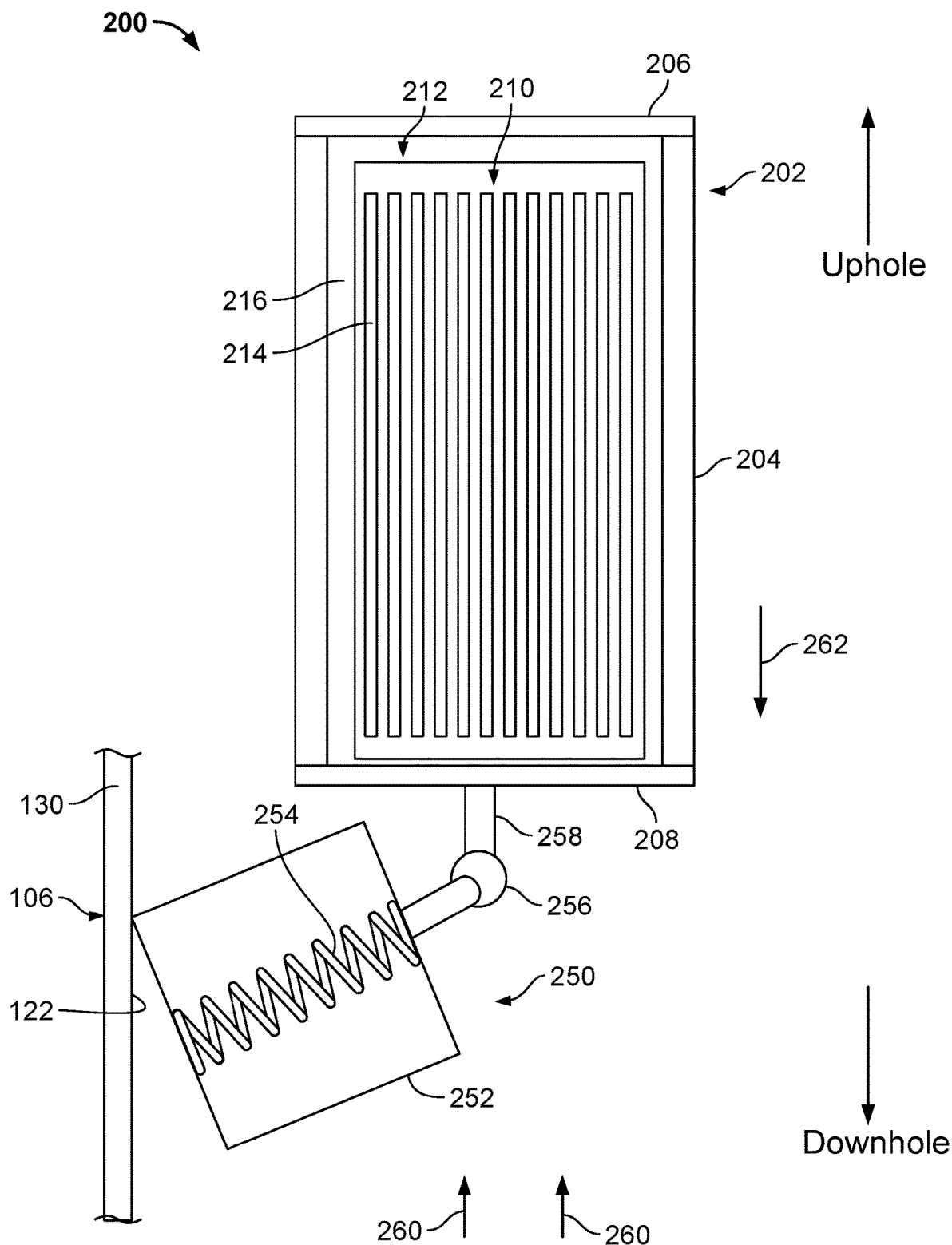
FIGS. 2 and 3A-3D are schematic illustrations of example implementations of a hazardous material canister according to the present disclosure.

FIG. 2 is a schematic illustration of a hazardous material canister 200 according to the present disclosure. In some aspects, the hazardous material canister 200 may be used as the hazardous material canister 126 shown in the hazardous material storage repository system 100 of FIG. 1. In some aspects, the hazardous material canister 200 may enclose and store nuclear or radioactive waste, such as SNF or high level waste. As described in the example emplacement process of the canisters 126 into the hazardous material storage repository system 100 of FIG. 1, the hazardous material canister 200 may be placed in a human-unoccupiable deep directional drillhole (e.g., drillhole 104) for long term (e.g., hundreds if not thousands of years) storage. During the emplacement process, the hazardous material canister 200 may be moved into the directional drillhole 104 on a conveyance cable, such as, for example, a wireline cable. When the hazardous material canister 200 is lowered through the vertical portion 106 of the directional drillhole 104, there is a possibility that the cable (or a connection between the canister 200 and the cable) that supports the canister 200 may fail. Upon failure, the canister 200 will accelerate downward (e.g., in free fall) in the vertical portion 106 of the directional drillhole 104 (e.g., through a fluid in the drillhole 104).

If the directional drillhole 104 has a kickoff point for the transition portion 108 (e.g., a transition to a horizontal or nearly-horizontal drillhole portion from the vertical portion 106), then the canister 200 will slow and eventually stop in the horizontal drillhole portion 110. However, if the hazardous material storage repository system 100 has previously been filled with other hazardous material canisters 200, then the free-falling canister 200 could impact a stationary canister 200 with resulting damage to both hazardous material canisters 200. If the hazardous waste material (e.g., nuclear waste) inside the canister 200 is highly radioactive, there is a danger of release of this material into the drillhole portion 110, which could potentially lead to release into a surrounding subterranean formation 118, and possibly mobile water in such a formation or other formations (e.g., subterranean formation 112). The illustrated implementation of hazardous material canister 200 includes one or more features that, e.g., may reduce or prevent potential damage to the canister 200 due to a free-fall in the deep directional drillhole 104. For example, the hazardous material canister 200 may maintain its structural integrity and its value as an "engineered barrier" to the release of hazardous material during free-fall and/or impact with another object in the drillhole 104.

As shown in FIG. 2, the hazardous material canister 200 includes a housing 202 that is comprised of a middle portion 204 to which a top (or lid) 206 and bottom 208 are coupled (e.g., subsequent to enclosing the hazardous waste) to form an inner volume 212. In this example, the hazardous material is one or more SNF assemblies 210 that include SNF rods 214. In an example implementation, a material 216 (e.g., granular or particulate) is emplaced within the inner volume 212 of the canister 200 (surrounding the SNF assembly 210 (or assemblies 210) and even the SNF rods 214). This material 216 may be sand or another granular material (collectively referred to as "sand") and may be placed into the canister 200 to fill voids that surround the SNF assembly 210 (or rods 214). For example, in the case of the hazardous material being an SNF assembly comprised of SNF rods (in whole or part), then the SNF rods 214 occupy only about ⅓ or less of the inner volume 212 of the canister 200. A sudden impact on the canister 200 (e.g., due to a free-fall event) could cause the SNF rods 214 to buckle and break. Buckling, in some cases, occurs (during a free-fall situation) when a front (bottom or downhole) end of the SNF rod 214 is suddenly stopped (e.g., due to a collision). The rest of the SNF rod 214 initially continues downward due to momentum. If the SNF rod 214 is completely symmetric, then the SNF rod 214 will compress, but slight deviations from symmetry are usually present, and so the SNF rod 214 tends to bend. In this decelerating situation, that bending becomes unstable and the bend increases rapidly until the SNF rod 214 breaks.

To prevent buckling, aspects of the hazardous material canister 200 may provide minimal support for the sides of the SNF rods 214. In some cases, the structure of the SNF assembly 210 that holds the SNF rods 214 provides lateral support. But more resistance to buckling can be obtained by filling the voids in the SNF assembly 210 with the material 216 (e.g., sand or other a relatively dense material). In some aspects, the material 216 can be silicon-dioxide, clay, crushed rock, cement, epoxy, or other powder of a solid. The material 216 provides support of the sides of the SNF rods 214 in a collision that prevents or helps prevent the SNF rods 214 from buckling. In some aspects, the prevention of buckling may not require a very strong material since the initial horizontal bucking force is small, so many materials could be used.

In alternative aspects, a liquid or gel may be used as the material 216 to fill the voids in the inner volume 212 not occupied by the SNF assembly 210. The liquid or gel may provide less resistance to buckling relative to a solid.

The material 216 could achieve other purposes. For example, if the hazardous waste (i.e., SNF assembly 210) has sufficient concentration of fissionable material (e.g., U-235 or Pu-239), then there may be danger of a "criticality accident;" that is, a chain reaction taking place among these isotopes. The presence of water may increase the danger, since water acts as a "moderator" that slows neutrons and increases the likelihood that a neutron will trigger a fission. The material 216 can reduce this risk if it contains suitable amounts of neutron absorbers. Such absorbers are boron, cadmium, and cobalt, as some examples. These can be included (e.g., as part of the granular, solid, or liquid material 216) as metals or as compounds.

The material 216 that mitigates or helps mitigate damage to the SNF assembly 210 during transport and emplacement in the directional drillhole 104 may serve additional functions. For example, the material 216 may have thermal conduction qualities that effectively allow heat to be transferred from the SNF 210 to the housing 202 (and ultimately to the geologic environment). Materials like quartz/sand and/or bentonite, or a mixture of the two in some favorable proportion can serve this function as or as mixed in the material 216. Both have suitable thermal conduction characteristics. The thermal conductivity of the quartz/bentonite mixture may maintain lower temperatures inside the hazardous material canister 200.

As another example, in some aspects, with bentonite as or mixed with the material 216, the material 216 may include radionuclide sorptive qualities. In addition, by maintaining lower temperatures inside the hazardous material canister 200, such lower temperatures may keep the bentonite from transitioning from a smectite- to an illite-type clay. Such a transition is time and/or temperature dependent, and once it occurs, the bentonite no longer has the capacity to incorporate water into interlayer structures. The bentonite may also lose all or part of a capacity to sorb and retard radionuclides.

In some aspects, rather than bentonite being or being part of the material 216, one or more zeolites could be mixed with quartz sand (or replace the sand) of the material 216. For example, zeolites are ring structure silicate minerals that are porous and can be used as molecular sieves. Zeolites can be manufactured and tailored to have structural pores of different sizes to effectively trap different radionuclides. There are zeolites "doped" with (silver) Ag+ ions that are designed specifically to allow I-ions (Iodine ions) to enter the zeolite structure. When the I-ions bond with the Ag+ to form AgI, the larger molecular size irreversibly traps the Iodine in the zeolite, effectively immobilizing the Iodine. Other zeolites could target different radionuclides in a similar fashion.

In some aspects, inclusion of the material 216, such as sand, in the inner volume 212 of the hazardous material canister 200 may also prevent collapse of the canister 200 in the event of a rock collapse (e.g., collapse of the horizontal drillhole portion 110, including the casing (if any) by the surrounding subterranean formation). For example, when the hazardous material canister 200 is filled with the material 216, the material 216 may offer extremely strong resistance to crushing. Thus, when a strong force is applied to the canister 200 (e.g., from collapsing rock) the canister 200 may not bend because of the resistance of the material 216 to collapse.

As shown in FIG. 2, the example implementation of the hazardous material canister 200 also includes an impact absorber 250 that includes a bumper 252 that is coupled to the housing 202 of the hazardous material canister 200 through a joint 256 connected to the housing (e.g., through an extension 258). As shown, the bumper 252 is positioned at a bottom (downhole) end of the canister 200. In some aspects, the bumper 252 may, alternatively, be built into or part of the bottom 208 of the housing 202. The bumper 252 may absorb impact in a free-fall collision of the canister 200 with, e.g., another hazardous material canister in the drillhole 104, the casing 122 (as shown in this figure) or other object. In some aspects, the bumper 252 may also mitigate acceleration of a free-falling canister 200 from impact at the front (downhole) end. In some aspects, as shown, the impact absorber 252 can be or include a crushable material or a spring 254, either internal to the bumper 252 or surrounding the bumper 252.

In some aspects, the impact absorber 252 may assure or help assure safety of the canister 200 during lowering into the directional drillhole 104. For example, when the canister 200 is in place in a repository of the horizontal drillhole portion 110, there may not be a continuing danger of a fall, so the bumper 252 may no longer be needed. When the canister 200 is emplaced, the bumper 252 (and joint 256, and extension 258) may become a liability as a corrosion point that could create hydrogen gas within the casing 122. In a sealed environment such as the drillhole 104, such corrosion could cause an increase in pressure from corrosion volume expansion. For these reasons, in some aspects, the bumper 252 (and other illustrated components) may be made of a low-corrosion material. Possible materials include graphite, titanium, tungsten-carbide cobalt, or nickel-chromium compounds such as Inconel.

In some aspects, the impact absorber 252 may also include or act as a friction brake. For instance, when the hazardous material canister 200 is falling freely has shown by arrow 262) in the fluid-filled casing (with fluid 260 shown in the drillhole portion 106), the canister 200 may be unstable against tipping. In some cases, tipping brings the front (downhole) end of the canister 200 into contact with the casing 122. In a high velocity fall, the friction at this contact point can cause local heating and can apply a force on the canister 200 that could damage the canister integrity. The impact absorber 252 (or separate friction brake attached to the bumper 252) may include a friction brake as shown attached to an exterior of the housing 202 of the canister 200. For example, a section at the front (downhole) end of the canister 200 that is most prone to friction with the casing 122 can include the friction brake to mitigate damage from friction to the canister 200 in the case of a free fall (or otherwise). The friction brake may also utilize friction to slow the acceleration of a falling canister 200. In some aspects, a portion of the impact absorber 252 that acts as the friction brake (or the separate friction brake component of the bumper 252) can be curved (to minimize the friction), or rough or pointed to maximize the friction and provide a stronger limit on the velocity of the falling canister 200.

In some aspects, the friction brake could be part of the housing 202 (e.g., on the downhole end). If the brake is rigidly attached to the canister 200, then rotation would be an extension of that of the canister 200. As shown, the friction brake (as part of the impact absorber 252 or otherwise) could also be attached to the canister 200 with the joint 256 that allows relative rotation.

Figure 3A:
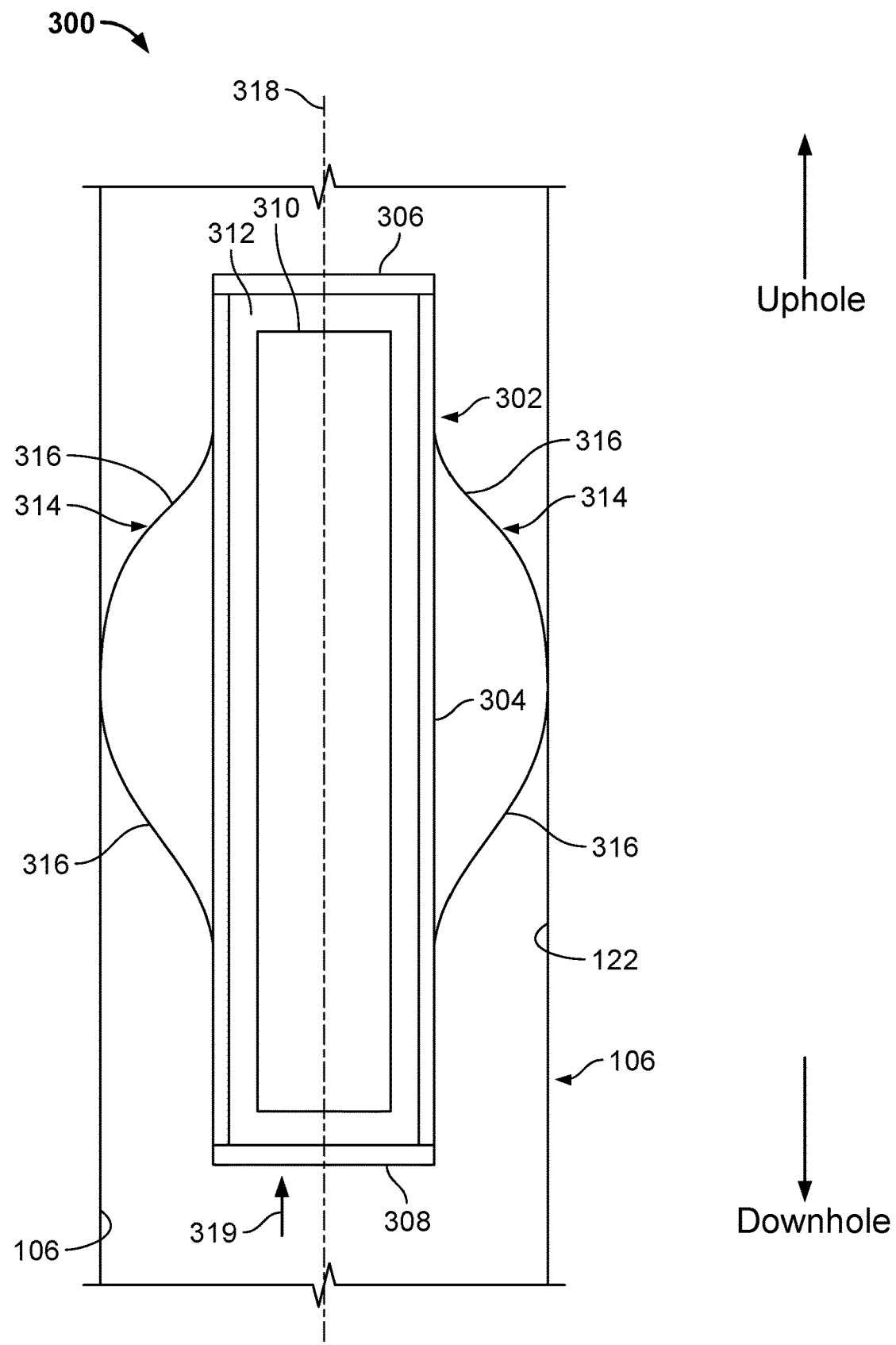

FIG. 3A is a schematic illustration of a hazardous material canister 300 according to the present disclosure. In some aspects, the hazardous material canister 300 may be used as the hazardous material canister 126 shown in the hazardous material storage repository system 100 of FIG. 1. In some aspects, the hazardous material canister 300 may enclose and store nuclear or radioactive waste, such as SNF or high level waste. As described in the example emplacement process of the canisters 126 into the hazardous material storage repository system 100 of FIG. 1, the hazardous material canister 300 may be placed in a human-unoccupiable deep directional drillhole (e.g., drillhole 104) for long term (e.g., hundreds if not thousands of years) storage. During the emplacement process, the hazardous material canister 300 may be moved into the directional drillhole 104 on a conveyance cable, such as, for example, a wireline cable. When the hazardous material canister 300 is lowered through the vertical portion 106 of the directional drillhole 104, there is a possibility that the cable (or a connection between the canister 300 and the cable) that supports the canister 300 may fail. Upon failure, the canister 300 will accelerate downward (e.g., in free fall) in the vertical portion 106 of the directional drillhole 104 (e.g., through a fluid in the drillhole 104). Further, although not specifically shown in FIG. 3A, the hazardous material canister 300 may include certain components as described with reference to FIG. 2, such as, for example, the material 216 and the impact absorber 252 (with or without a friction brake).

If the directional drillhole 104 has a kickoff point for the transition portion 108 (e.g., a transition to a horizontal or nearly-horizontal drillhole portion from the vertical portion 106), then the canister 300 will slow and eventually stop in the horizontal drillhole portion 110. However, if the hazardous material storage repository system 100 has previously been filled with other hazardous material canisters 300, then the free-falling canister 300 could impact a stationary canister 300 with resulting damage to both hazardous material canisters 300. If the hazardous waste material (e.g., nuclear waste) inside the canister 300 is highly radioactive, there is a danger of release of this material into the drillhole portion 110, which could potentially lead to release into a surrounding subterranean formation 118, and possibly mobile water in such a formation or other formations (e.g., subterranean formation 112). The illustrated implementation of hazardous material canister 300 includes one or more features that, e.g., may reduce or prevent potential damage to the canister 300 due to a free-fall in the deep directional drillhole 104. For example, the hazardous material canister 300 may maintain its structural integrity and its value as an "engineered barrier" to the release of hazardous material during free-fall and/or impact with another object in the drillhole 104.

As shown in FIG. 3A, the hazardous material canister 300 includes a housing 302 that is comprised of a middle portion 304 to which a top (or lid) 306 and bottom 308 are coupled (e.g., subsequent to enclosing the hazardous waste) to form an inner volume 312. In this example, the hazardous material is one or more SNF assemblies 310 that include SNF rods (not specifically shown here). As shown, the hazardous material canister 300 also includes two or more centralizers 314 that are attached (e.g., radially around the canister 300) to the housing 302. In some aspects, there may be three centralizers 314 attached to the housing 302 and spaced 120° radially apart.

In this example, each centralizer 314 includes spacers (also called "arms") 316 that are either spring-loaded or deployable to bias against, e.g., the casing 122 as shown. In this example, the centralizers 314 that circumscribe the hazardous material canister 300 operate during deployment of the canister 300 to hold the canister 300 near a radial centerline 318 of the vertical drillhole portion 106 (and other drillhole portions) to provide space between the canister 300 and the casing 122. Thus, during operation, the arms 316 of the centralizers 314 are biased or deployed to contact the casing 122 and align a radial centerline of the canister 300 with the centerline 318. In this example, the centralizer arms 314 may be made of spring steel or otherwise biased by springs outward against the casing 122. The centralizers 314, in some aspects, can reduce the velocity that a falling canister 300 may reach in free-fall through frictional contact with the casing 122, thereby generating a frictional force that opposes the free-fall (caused by the force of gravity) within a fluid 319 in the drillhole portion 106.

Figure 3B:
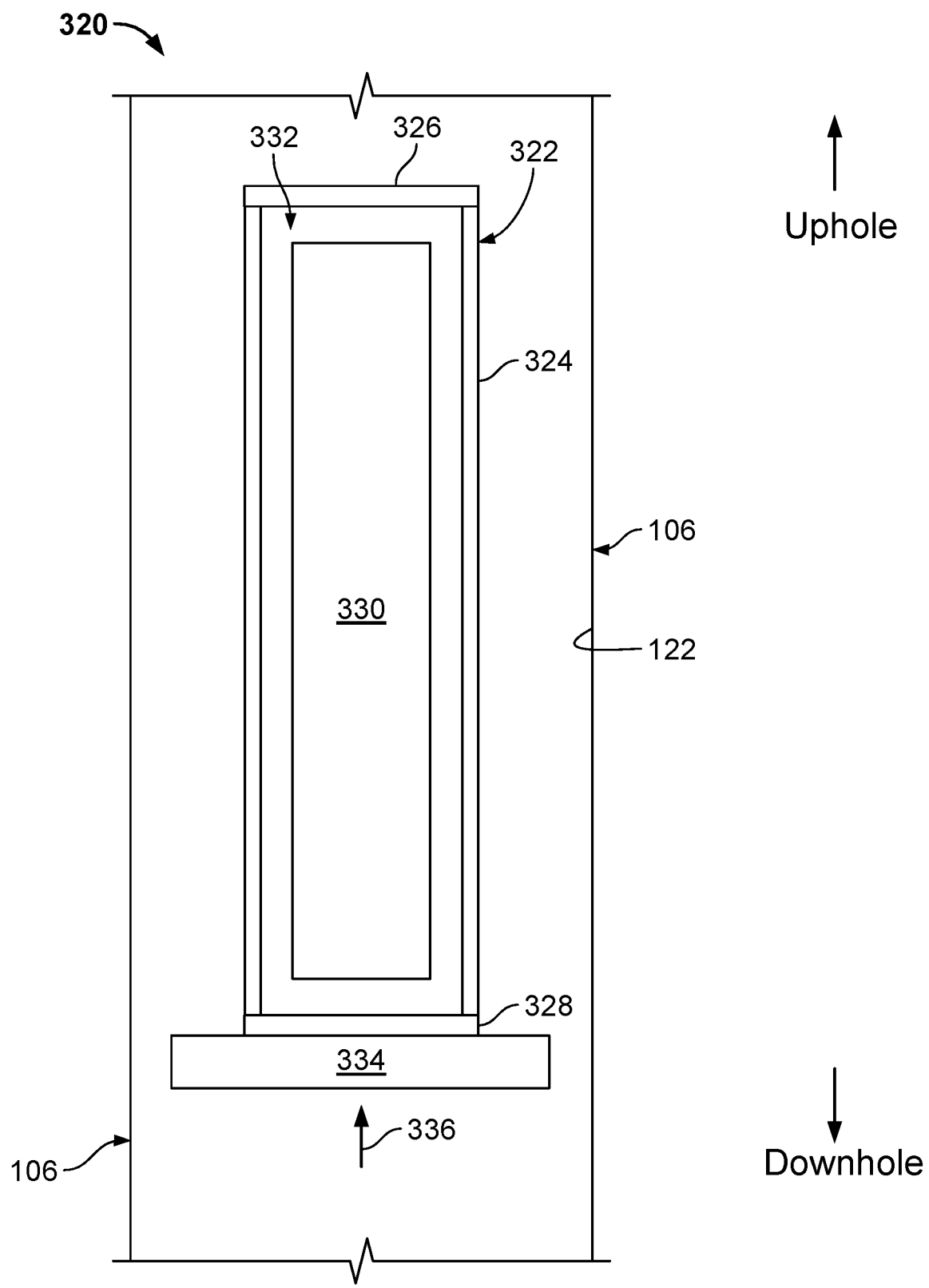

FIG. 3B is a schematic illustration of a hazardous material canister 320 according to the present disclosure. In some aspects, the hazardous material canister 320 may be used as the hazardous material canister 126 shown in the hazardous material storage repository system 100 of FIG. 1. In some aspects, the hazardous material canister 320 may enclose and store nuclear or radioactive waste, such as SNF or high level waste. As described in the example emplacement process of the canisters 126 into the hazardous material storage repository system 100 of FIG. 1, the hazardous material canister 320 may be placed in a human-unoccupiable deep directional drillhole (e.g., drillhole 104) for long term (e.g., hundreds if not thousands of years) storage. During the emplacement process, the hazardous material canister 320 may be moved into the directional drillhole 104 on a conveyance cable, such as, for example, a wireline cable. When the hazardous material canister 320 is lowered through the vertical portion 106 of the directional drillhole 104, there is a possibility that the cable (or a connection between the canister 320 and the cable) that supports the canister 320 may fail. Upon failure, the canister 320 will accelerate downward (e.g., in free fall) in the vertical portion 106 of the directional drillhole 104 (e.g., through a fluid in the drillhole 104). Further, although not specifically shown in FIG. 3B, the hazardous material canister 320 may include certain components as described with reference to FIG. 2, such as, for example, the material 216 and the impact absorber 252 (with or without a friction brake), as well as certain components as described with reference to FIG. 3A, such as, for example, the centralizers 314.

If the directional drillhole 104 has a kickoff point for the transition portion 108 (e.g., a transition to a horizontal or nearly-horizontal drillhole portion from the vertical portion 106), then the canister 320 will slow and eventually stop in the horizontal drillhole portion 110. However, if the hazardous material storage repository system 100 has previously been filled with other hazardous material canisters 320, then the free-falling canister 320 could impact a stationary canister 320 with resulting damage to both hazardous material canisters 320. If the hazardous waste material (e.g., nuclear waste) inside the canister 320 is highly radioactive, there is a danger of release of this material into the drillhole portion 110, which could potentially lead to release into a surrounding subterranean formation 118, and possibly mobile water in such a formation or other formations (e.g., subterranean formation 112). The illustrated implementation of hazardous material canister 320 includes one or more features that, e.g., may reduce or prevent potential damage to the canister 320 due to a free-fall in the deep directional drillhole 104. For example, the hazardous material canister 320 may maintain its structural integrity and its value as an "engineered barrier" to the release of hazardous material during free-fall and/or impact with another object in the drillhole 104.

As shown in FIG. 3B, the hazardous material canister 320 includes a housing 322 that is comprised of a middle portion 324 to which a top (or lid) 326 and bottom 328 are coupled (e.g., subsequent to enclosing the hazardous waste) to form an inner volume 332. In this example, the hazardous material is one or more SNF assemblies 330 that include SNF rods (not specifically shown here). In this example, the hazardous material canister 320 also includes a disc (also called a brake) 334 that is coupled to a downhole end of the housing 322. In this example, therefore, a velocity of the hazardous material canister 320 in free-fall may be limited or reduced through the brake 334 driven by a high flow of the liquid 336 in the drillhole 106 relative to the canister movement through the drillhole 106 during free-fall.

As shown in FIG. 3B, the brake 334 (which may be made from the same material as the housing 322 or a different material) may have a radial cross-section area that is larger than a radial cross-section area of the canister 320. For example, in some aspects, a diameter of the brake 334 may be smaller than but almost as large as a diameter of the casing 122. In some aspects, however, a size of the brake 334 (and surface finish of the brake 334) may be such that small discontinuities in the inner surface of the casing 122 do not impede the placement (e.g., normal, controlled movement) of the canister. This can be achieved, for example, by having an outer edge of the brake 334 (e.g., a radial circumference edge closest to the casing 122) either flexible (e.g., thinner) or sacrificial, with small sections breaking off if an impediment is encountered.

In some aspects, the brake 334 and one or more centralizers (such as centralizers 314) may be employed on the hazardous material canister 320 in order to increase a braking force on the canister 320 in free fall. For instance, with respect to the braking principle, a rapid flow of the liquid 336 may provide a force on the brake 334 and the brake 334 may then cause the arms 316 of the centralizer 314 to be deployed with greater force. In some aspects, one or more of the arms 316 may be connected to the brake 334; thus, a force applied on the brake 334 may urge the arms 316 into contact with the casing 122 or, if already in contact, against the casing 122 with greater force (e.g., normal to the casing 122). In some aspects, the brake 334 may not be rigidly attached to the housing 322 but may retain some movement axially along the housing 322, e.g., to push against arms 316 of the centralizers 314.

Figure 3C:
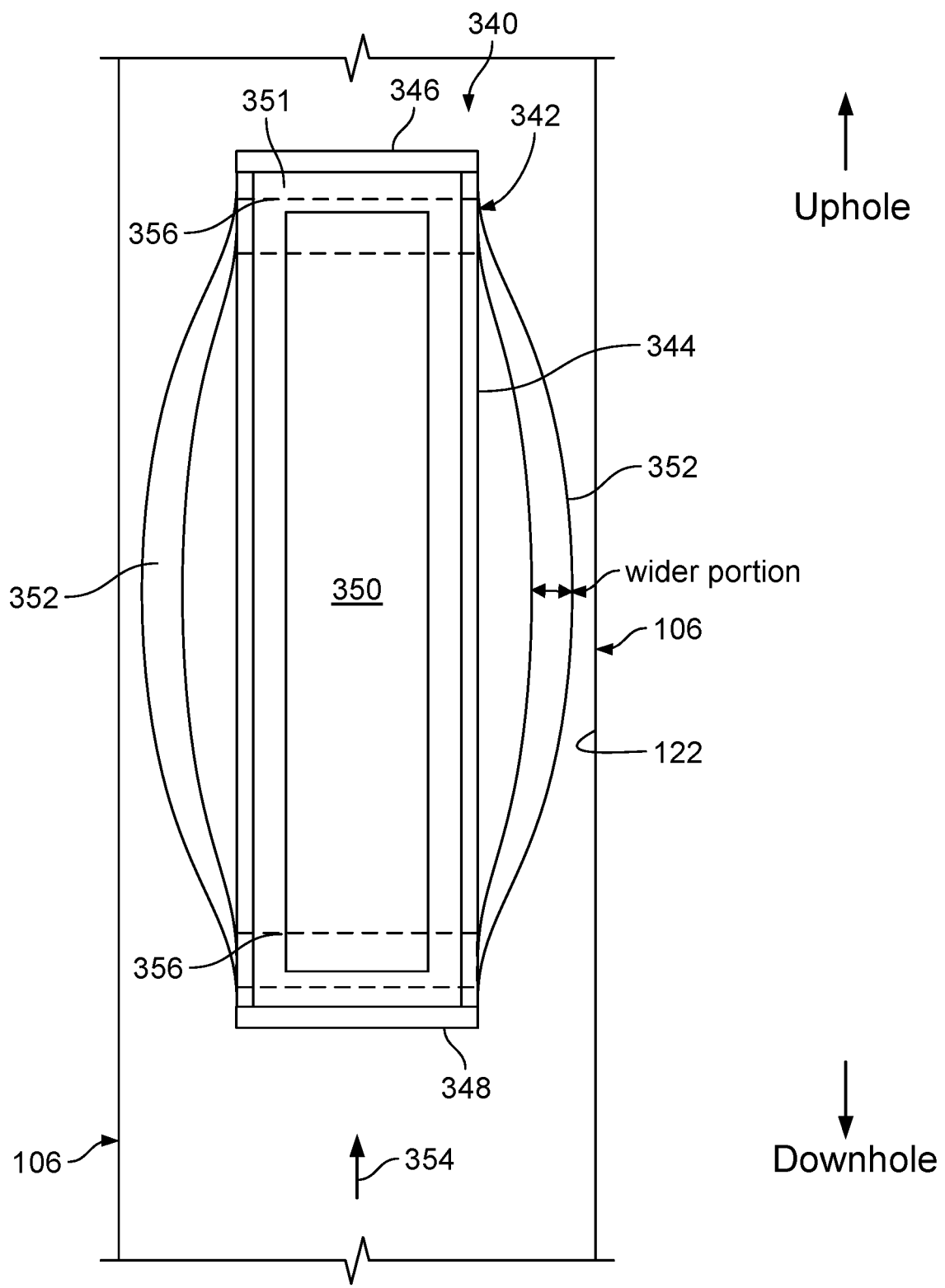

FIG. 3C is a schematic illustration of a hazardous material canister 340 according to the present disclosure. In some aspects, the hazardous material canister 340 may be used as the hazardous material canister 126 shown in the hazardous material storage repository system 100 of FIG. 1. In some aspects, the hazardous material canister 340 may enclose and store nuclear or radioactive waste, such as SNF or high level waste. As described in the example emplacement process of the canisters 126 into the hazardous material storage repository system 100 of FIG. 1, the hazardous material canister 340 may be placed in a human-unoccupiable deep directional drillhole (e.g., drillhole 104) for long term (e.g., hundreds if not thousands of years) storage. During the emplacement process, the hazardous material canister 340 may be moved into the directional drillhole 104 on a conveyance cable, such as, for example, a wireline cable. When the hazardous material canister 340 is lowered through the vertical portion 106 of the directional drillhole 104, there is a possibility that the cable (or a connection between the canister 340 and the cable) that supports the canister 340 may fail. Upon failure, the canister 340 will accelerate downward (e.g., in free fall) in the vertical portion 106 of the directional drillhole 104 (e.g., through a fluid in the drillhole 104). Further, although not specifically shown in FIG. 3C, the hazardous material canister 340 may include certain components as described with reference to FIG. 2, such as, for example, the material 216 and the impact absorber 252 (with or without a friction brake), as well as certain components as described with reference to FIG. 3B, such as, for example, the brake 334.

If the directional drillhole 104 has a kickoff point for the transition portion 108 (e.g., a transition to a horizontal or nearly-horizontal drillhole portion from the vertical portion 106), then the canister 340 will slow and eventually stop in the horizontal drillhole portion 110. However, if the hazardous material storage repository system 100 has previously been filled with other hazardous material canisters 340, then the free-falling canister 340 could impact a stationary canister 340 with resulting damage to both hazardous material canisters 340. If the hazardous waste material (e.g., nuclear waste) inside the canister 340 is highly radioactive, there is a danger of release of this material into the drillhole portion 110, which could potentially lead to release into a surrounding subterranean formation 118, and possibly mobile water in such a formation or other formations (e.g., subterranean formation 112). The illustrated implementation of hazardous material canister 340 includes one or more features that, e.g., may reduce or prevent potential damage to the canister 340 due to a free-fall in the deep directional drillhole 104. For example, the hazardous material canister 340 may maintain its structural integrity and its value as an "engineered barrier" to the release of hazardous material during free-fall and/or impact with another object in the drillhole 104.

As shown in FIG. 3C, the hazardous material canister 340 includes a housing 342 that is comprised of a middle portion 344 to which a top (or lid) 346 and bottom 348 are coupled (e.g., subsequent to enclosing the hazardous waste) to form an inner volume 351. In this example, the hazardous material is one or more SNF assemblies 350 that include SNF rods (not specifically shown here). In this example, the hazardous material canister 340 also includes two or more parachutes 352 that are coupled to the housing 342, e.g., through rings 356 that circumscribe a circumference of the housing 342. In this example, therefore, a velocity of the hazardous material canister 340 in free-fall may be limited or reduced through the parachutes 352 driven by a high flow of the liquid 354 in the drillhole 106 relative to the canister movement through the drillhole 106 during free-fall.

In this example, the parachutes 352 may be broader on the leading end (e.g., on the downhole end of the canister 340). The broader sections of the parachutes 352, or "wings," may be subject to a force that pushes the connection point of the parachutes 352 and the ring 356 upward and thus may push the parachutes 352 more tightly against the inner surface of the casing 122 or, generally, spread out the parachutes 352 to create more drag on the canister 340 during a free fall event. The force of the fluid 354 on the parachutes 352 may also provide force to reduce the acceleration of the canister 340 during free-fall.

Figure 3D:
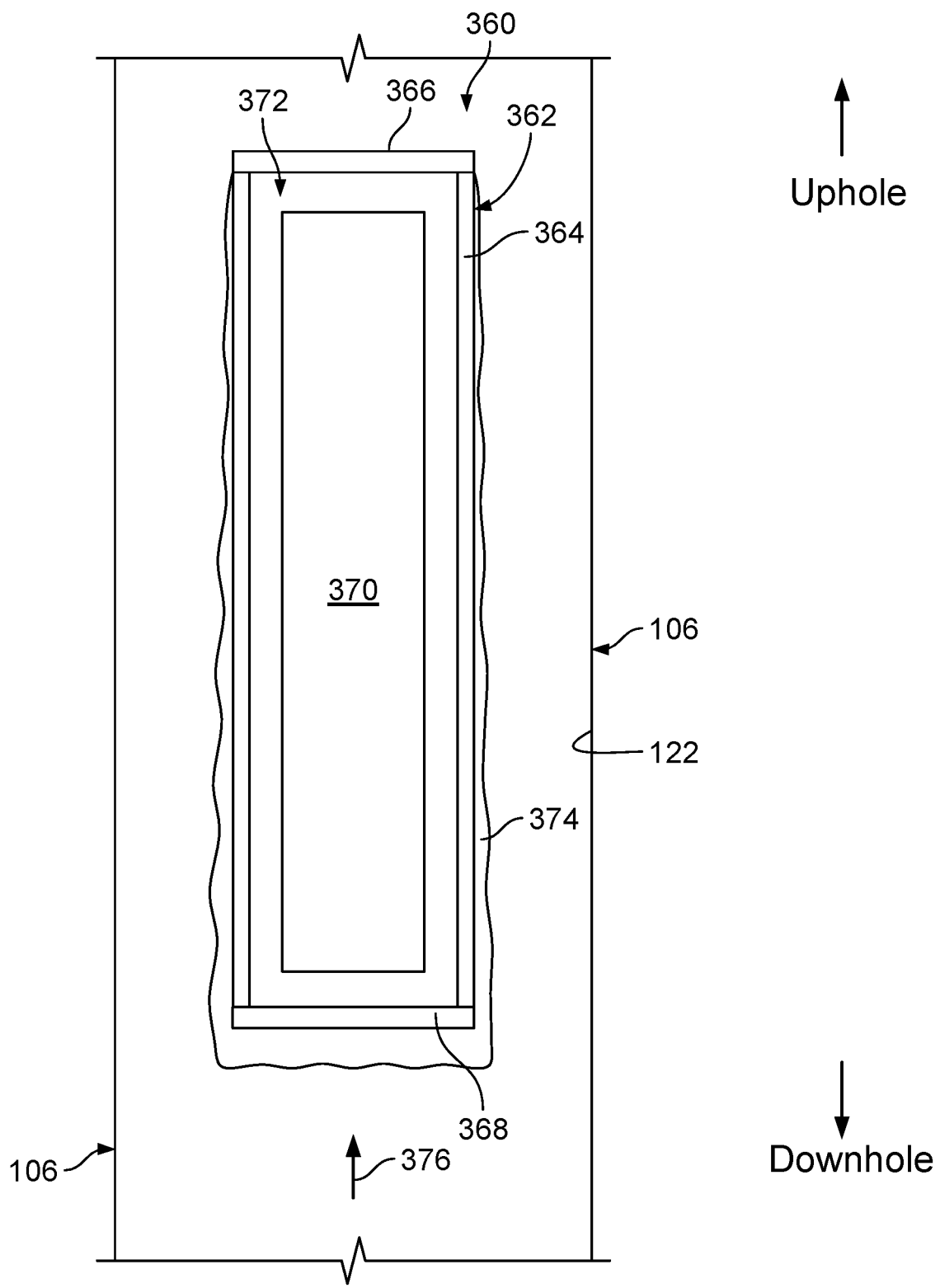

FIG. 3D is a schematic illustration of a hazardous material canister 360 according to the present disclosure. In some aspects, the hazardous material canister 360 may be used as the hazardous material canister 126 shown in the hazardous material storage repository system 100 of FIG. 1. In some aspects, the hazardous material canister 360 may enclose and store nuclear or radioactive waste, such as SNF or high level waste. As described in the example emplacement process of the canisters 126 into the hazardous material storage repository system 100 of FIG. 1, the hazardous material canister 360 may be placed in a human-unoccupiable deep directional drillhole (e.g., drillhole 104) for long term (e.g., hundreds if not thousands of years) storage. During the emplacement process, the hazardous material canister 360 may be moved into the directional drillhole 104 on a conveyance cable, such as, for example, a wireline cable. When the hazardous material canister 360 is lowered through the vertical portion 106 of the directional drillhole 104, there is a possibility that the cable (or a connection between the canister 360 and the cable) that supports the canister 360 may fail. Upon failure, the canister 360 will accelerate downward (e.g., in free fall) in the vertical portion 106 of the directional drillhole 104 (e.g., through a fluid in the drillhole 104). Further, although not specifically shown in FIG. 3D, the hazardous material canister 360 may include certain components as described with reference to FIG. 2, such as, for example, the material 216 and the impact absorber 252 (with or without a friction brake), as well as certain components as described with reference to FIG. 3A, 3B, or 3C, such as, for example, the centralizers 314, the brake 334, and/or the parachutes 352.

If the directional drillhole 104 has a kickoff point for the transition portion 108 (e.g., a transition to a horizontal or nearly-horizontal drillhole portion from the vertical portion 106), then the canister 360 will slow and eventually stop in the horizontal drillhole portion 110. However, if the hazardous material storage repository system 100 has previously been filled with other hazardous material canisters 360, then the free-falling canister 360 could impact a stationary canister 360 with resulting damage to both hazardous material canisters 360. If the hazardous waste material (e.g., nuclear waste) inside the canister 360 is highly radioactive, there is a danger of release of this material into the drillhole portion 110, which could potentially lead to release into a surrounding subterranean formation 118, and possibly mobile water in such a formation or other formations (e.g., subterranean formation 112). The illustrated implementation of hazardous material canister 360 includes one or more features that, e.g., may reduce or prevent potential damage to the canister 360 due to a free-fall in the deep directional drillhole 104. For example, the hazardous material canister 360 may maintain its structural integrity and its value as an "engineered barrier" to the release of hazardous material during free-fall and/or impact with another object in the drillhole 104.

As shown in FIG. 3D, the hazardous material canister 360 includes a housing 362 that is comprised of a middle portion 364 to which a top (or lid) 366 and bottom 368 are coupled (e.g., subsequent to enclosing the hazardous waste) to form an inner volume 372. In this example, the hazardous material is one or more SNF assemblies 370 that include SNF rods (not specifically shown here). In this example, the hazardous material canister 360 also includes a foam (e.g., a porous material that naturally expands to fill a space) cover 374 that is formed around or attached (e.g., adhesively) around all, most, or some of the housing 362 of the canister 360. In this example, the foam cover 374 covers most of the exterior of the housing 362, e.g., all but the lid 366. In alternative implementations, the foam cover 374 may cover less of the housing 362 (e.g., only a downhole end or portion) or as much as the whole housing 362.

In some aspects, the foam cover 374 may be flexible enough that small discontinuities in the casing 122 may compress the foam and allow the canister 360 to be emplaced in the horizontal drillhole portion 110. The foam cover 374 may also offer resistance to fluid flow of the drillhole fluid 376. Since the force of a liquid on an object (in the high Reynold's number limit) is proportional to the square of the velocity of the object through the liquid, the fluid 376 may flow through and/or around the foam cover 374 with little resistance when the canister 360 is being slowly lowered into the vertical drillhole portion 106. However, if the canister 360 falls freely, the resistance of the foam cover 374 increases rapidly, and that increases the force of the flowing liquid 376 on the foam cover 374, which in turn acts to reduce the acceleration of the canister 360. The limiting velocity of the canister 360 surrounded by the foam cover 374 may be substantially less than the limiting velocity of a hazardous material canister that does not include the foam cover 374.

The foam cover 374, in some implementations, may be made of the same (or similar) corrosion-resistant material as the housing 362 (all or part). For example, a metal material, such as a metal foam, may be used for the foam cover 374. In some aspects, other components described with respect to the example implementations of the hazardous material canister can also be made of the foam material (e.g., a metal foam). For instance, all or part of the impact absorber 252 and/or the brake 334 may be made of the foam material (as with the foam cover 374).

FIGS. 4A-4B are schematic illustration of a hazardous material canister 400 according to the present disclosure. FIG. 4A shows a schematic illustration of the canister 400, while FIG. 4B shows a detail of a portion of the canister 400. In some aspects, the hazardous material canister 400 may be used as the hazardous material canister 126 shown in the hazardous material storage repository system 100 of FIG. 1. Further, in some aspects, the features described with reference to FIGS. 2 and 3A-3D may also be implemented in the hazardous material canister 400 shown in FIG. 4A. As described in the example emplacement process of the canisters 126 into the hazardous material storage repository system 100 of FIG. 1, the hazardous material canister 400 may be placed in a human-unoccupiable deep directional drillhole (e.g., drillhole 104) for long term (e.g., hundreds if not thousands of years) storage.

In some aspects, the hazardous material canister 400 may enclose and store nuclear or radioactive waste, such as SNF or high level waste. For example, when hazardous material (e.g., nuclear waste such as spent nuclear fuel or high level waste) is loaded into the hazardous material canister 400 (e.g., for storage in a human-unoccupiable, deep directional drillhole), the canister seal must be made secure against even miniscule leakage. Conventionally, this is done by welding the lid, followed by both visual and radiographic inspection, and a repair of the welding if needed. In the cases of nuclear waste, if all this is done in a "hot cell" (e.g., a room a in which any escaped radionuclides can be collected and safely removed without escaping the room in an unwanted manner), then the hot cell must be large and capable of incorporating all the tasks including welding. Such large hot cells can be very expensive, particularly if they are designed to be portable for use at multiple locations.

In some aspects, the loading of, e.g., spent nuclear fuel in the hazardous material canister 400 and then the sealing of that canister 400 may proceed in a manner that will provide a barrier to escape of radionuclides that will perform for thousands of years. Most of the spent nuclear fuel of interest is located in either cooling pools or dry casks, large concrete and steel containers that provide safety from the gamma radiation that spent fuel emits. Spent nuclear fuel consists of pellets consisting primarily of uranium dioxide, but containing a large inventory of highly radioactive fission fragments, transuranics such as plutonium and americium, and other radioactive elements created when the fuel was in the nuclear reactor. Removing the fuel assembly from a pool or dry cask and placing the fuel assembly in a canister for disposal may be required to be performed in a hot cell in order to prevent the release of radioisotopes to the environment (e.g., outside of the hot cell). Within the fuel assemblies, the radioisotopes are confined to long tubes known as cladding, typically manufactured out of a metal alloy (such as zircalloy). The cladding provides isolation of the radioisotopes, and the main concern for safely moving the rods into canisters is that the cladding may have lost integrity, e.g., that there may be pinholes or cracks in the cladding that allow radionuclides to escape. For that reason, the transfer is typically done in the hot cell. A tiny hole in the fuel rod could allow radioactive krypton-85, for example, to leak. Other radioisotopes that might leak include tritium gas (hydrogen in which one or both hydrogen atoms are replaced with $H_3$), chlorine-36, and materials that become volatile at high temperature, such as iodine. In addition, small particles of the fuel pellets that could have separated from the pellets and formed a dust could leak if there is a sufficiently large hole or if the cladding has substantial damage.

The hazardous material canister 400, for example, provides safety against escape of radioisotopes when the fuel assembly or the fuel pellets are placed in an open housing of the canister while facilitating the sealing of two or more lids (or caps) on the housing. In some aspects, at least one of the lids may be sealed to the housing of the canister outside of a hot cell. For example, as shown, the hazardous material canister 400 includes a housing 402 that is comprised of a middle portion 404 to which tops (or lids) 406a and 406b, as well as a bottom 408 are coupled (e.g., subsequent to enclosing the hazardous waste) to form an inner volume 412. In this example, the hazardous material is one or more SNF assemblies 410 that include SNF rods (not specifically shown here).

As shown more specifically in FIG. 4B, the hazardous material canister 400 includes a seal that includes two separate barriers. For example, inner lid 406b may be attached to the housing 402 of the hazardous material canister 400. In some aspects, the inner lid 406b is removably attached to the housing 404, such as by mechanical attachment (e.g., a threaded attachment). For example, as shown, threads 416 may be formed on a portion of an inner radial surface of the middle portion 404 of the housing 402. Threads 420 are also formed on a radial edge of the inner lid 406b to mate (e.g., threadingly) with the housing 402. As shown, a diameter of the inner lid 406b may be less than a diameter of outer lid 406a (and a diameter of the housing 402 at the threads 416).

In such examples, the inner lid 406b may not be semi-permanently (e.g., welded) in place in such a way as to require destruction of the inner lid 406b or part of the housing 402 to remove the inner lid 406b. Other example removable attachment techniques include use of a melted metal solder or an adhesive. The inner lid attachment may provide sufficient safety for the canister 400 to be removed from the hot cell but may not provide sufficient safety for the long term requirements for disposal of the nuclear waste 410. In some aspects, the inner lid 406b may stay in place after the hazardous material canister 400 is placed in a hazardous waste repository in a deep, directional drillhole (such as in system 100).

In some aspects, the inner lid 406b may not provide a seal that prevents the leakage of radioactive waste for a long time, e.g., hundreds if not thousands of years, but instead may facilitate removal of the hazardous material canister 400 from the hot cell. As shown in FIG. 4B, a seal 418 (e.g., a gasket such as a metal gasket) may be positioned between the inner lid 406b and the middle portion 404 (e.g., at a shoulder 422 of the middle portion 404). In some aspects, the gasket 418 is put under sufficient pressure by the mechanical placement of the inner lid 406b that the gasket 418 provides a seal of the inner lid 406b to the housing 402 that provides a barrier for the escape of radioactive material from the SNF assembly 410.

As shown, the shoulder 422 may separate a storage portion of the volume 412 (e.g., below the shoulder 422 toward the bottom 408) from the threaded portion 416. As shown, the storage portion has a smaller diameter than the threaded portion 416 in this example.

As shown, outer lid 406a is attached to the housing 402 subsequent to attachment of the inner lid 406b. The outer lid 406a, in some aspects, may provide greater safety against unwanted leakage of the radioactive waste from the SNF assembly 410 by comprising a semi-permanent seal, for example, by welding the outer lid 406a to the housing 402. As shown in this example, a weld 414 is created between the outer lid 406a and a top radial edge of the housing 402, such as by spin welding. Although not required, one or more of the components of the hazardous material canister 400, such as the housing 402 and the lids 406a and 406b, may be made from similar materials (or the same material), such as a corrosion resistant alloy (e.g., CRA-625).

In some aspects, the hazardous material canister 400 (with the inner lid 406b attached) may be removed from a hot cell such that the outer lid 406a may be sealed to the housing 404 of the canister 400. In some aspects, the outer lid 406a may be certified as providing an "engineered barrier" as required by a regulatory agency.

In an example operation of hazardous material canister 400, the SNF assembly 410 is placed in the inner volume 412 of the housing 402 (e.g., which is open at a top end and may be enclosed with the bottom 408). The placement of the SNF assembly 410 may be in a hot cell. Subsequently, and still in the hot cell, the inner lid 406b may be attached (e.g., threadingly) to the housing 402 to seal the SNF assembly 410 within the volume 412. The hazardous material canister 400 may then leave the hot cell, with only the inner lid 406b in place (i.e., not the outer lid 406a). Outside the hot cell, the outer lid 406a can be attached to the housing 402 (e.g., by spin welding or otherwise). The sealed hazardous material canister 400 may then be transported for emplacement in a hazardous waste repository system, such as system 100.

Figure 5:
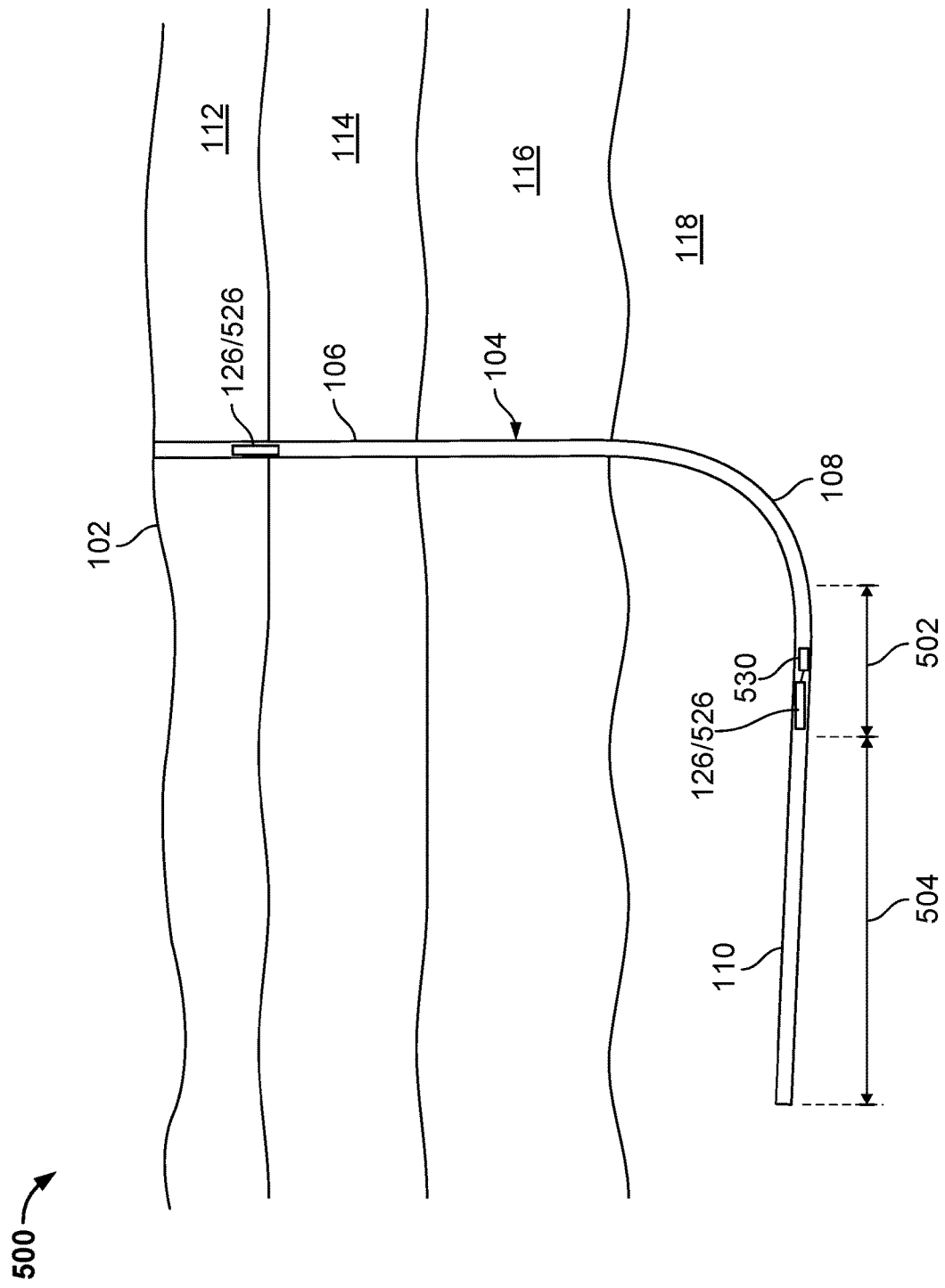
FIG. 5 is a schematic illustration of an example implementation of a hazardous material storage repository that includes a safety runway portion according to the present disclosure.

FIG. 5 is a schematic illustration of an example implementation of a hazardous material storage repository 500 that includes a safety runway portion 502. As shown in FIG. 5, certain components of the hazardous material storage repository 500 are the same as the hazardous material storage repository 100 shown in FIG. 1, such as, for example, a deep, human-unoccupiable directional drillhole 104 formed from the terranean surface 102 through subterranean formations 112 through 118. As shown, the directional drillhole (or wellbore) 104 includes a vertical drillhole portion 106 coupled to a transition, or radiussed, drillhole portion 108. The transition drillhole 108 is coupled to a horizontal drillhole portion 110. In this example, the horizontal drillhole portion 110 is inclined relative to "horizontal" such that a first end of the drillhole portion 110 that is coupled to the transition drillhole 108 is deeper (e.g., greater TVD) than a second end of the portion 110 opposite the first end. Alternatively, the horizontal drillhole 110 may be close to or exactly horizontal. In some aspects, all or part of the directional drillhole 104 may include a casing cemented in place.

As also described with reference to FIG. 1, hazardous material canisters 126 that enclose hazardous material (e.g., nuclear waste such as SNF or high level waste) may be emplaced in a storage area 504 at the second end of the horizontal drillhole portion 110. As described in the present disclosure, emplacement of hazardous material canisters 126 may include moving the canisters 126 into the storage area 504, e.g., by a downhole conveyance, such as a tractor or by a force applied by coiled tubing or a working string (e.g., of threaded tubulars).

In some situations, a particular canister 126 could be accidentally released from the downhole conveyance while the canister 126 is being lowered into the directional drillhole 104. That could be due to a consequence of failure of a latch that holds the canister 126 to the conveyance, or other reason. The canister 126 may then fall at increasing velocity down the vertical portion 106 of the drillhole 104. This presents a danger that the canister 126 may collide with, e.g., a previously-placed canister, and be damaged and will release hazardous material into the drillhole 104 (and surrounding subterranean formations 112-118). In some aspects, one or more features of the canister 126 can mitigate or prevent such damage, e.g., as shown in FIGS. 2 and 3A-3D.

The hazardous material storage repository 500 may, in some aspects, be operable based on its design (independent of a design of the hazardous material canisters 126 or other canisters) to bring a released canister 126 to a safe stop, avoiding impacts with any object that could cause damage to the canister 126 (or other objects in the drillhole) or release of hazardous material from a damaged canister 126. As shown, the hazardous material storage repository 500 includes a safety runway 502 that is a portion of the horizontal drillhole portion 110. The safety runway 502 is of sufficient length or inclination away (or both) from horizontal (e.g., toward the terranean surface 102), or both, to safely bring an improperly or accidentally released (and free-falling) canister 126 to rest within the drillhole portion 110 without damagingly contacting one or more hazardous material canisters 126 that are already emplaced within the storage area 504.

In some aspects, the sufficient length and/or sufficient inclination may be determined according to one or more test canisters (shown as hazardous material canisters 526) used in a constructed directional drillhole (e.g., the drillhole 104 or a similar "test" drillhole) that includes a storage area (e.g., storage area 504) formed in at least a part of the horizontal portion 110 of the drillhole 104. For example, before any hazardous material in placed in a storage area of a deep, directional drillhole, one or more test canisters 526 may be inserted into the vertical portion of the drillhole from the terranean surface and purposefully allowed to fall freely into and through the vertical portion of the drillhole. The test canister 526 may be identical in all key parameters to that of a hazardous waste canister that encloses waste (e.g., high level radioactive waste or spent nuclear fuel), except that the test canister 526 will enclose non-hazardous material (e.g., with the same or similar weight as proposed hazardous waste). Thus, the test canister 526 may match the disposal canister in weight, weight distribution, and surface properties (such as coefficient of friction and roughness for liquid flow). The drillhole, including the vertical portion, curved portion, and the horizontal or nearly horizontal portion, may be filled with the same fluid or gas that is present when a disposal canister would be inserted therein (if not already filled with such fluid). In some aspects, a "test" drillhole may transition to the directional drillhole 104 based on a successful test of the test canisters 526 (and, in some aspects, meeting other criteria for suitability as a hazardous waste repository).

The test canister 526 falls through the fluid in the drillhole, accelerating as it falls, and the test canister 526 may reach a terminal velocity at which time the velocity will remain approximately constant. It may not be possible to calculate that terminal velocity explicitly since the fluid flow around the test canister will likely be in a turbulent range, and insufficient analytic methods may exist to determine such velocity under these conditions. The terminal velocity can be estimated by using approximate methods and/or numerical simulations; these suggest that the terminal velocity for a 1000 kg test canister 526 will be about 10 meters per second (in the example here). However, the actual velocity of the test canister 526 may also be measured during free fall within the vertical portion of the directional drillhole.

When the test canister 526 enters the curved portion, and then the horizontal (or nearly-horizontal) portion, it may slow from both fluid resistance and from friction with the walls of the drillhole (or casing). The distance that the test canister 526 may travel depends at least in part on the terminal velocity, the coefficient of friction of the exterior of the canister 526, and the upward tilt (if any) of the horizontal portion of the directional drillhole. A "stopping distance" (also called the safety runway) may be determined that is a distance that the test canister travels in the horizontal portion of the drillhole until the canister comes to zero velocity, i.e., stops from the free fall.

As an example, if a terminal velocity of the test canister 526 is 10 meters per second (m/s) and the coefficient of friction, k, is 0.1, a stopping distance will be approximately 25 meters. In some aspects, according to dimensional analysis, the stopping distance will be approximately proportional to the square of the terminal velocity. Thus, a length of the horizontal portion of the drillhole that includes the storage area may be determined as a length of the repository in which hazardous waste canisters (i.e., the storage area) are stored plus the stopping distance (or safety runway). For instance, for a 1 km horizontal portion of the drillhole, 25 meters may be the stopping distance portion (i.e., the safety runway), leaving 975 meters for the repository length. In this example, there is only a 4% loss (i.e., percentage of safety runway length to length of storage area of the horizontal portion of the drillhole). As another example, for a 3 km horizontal portion length and a 25 meter safety runway portion, canister capacity in the storage area is reduced by only 1.33%.

As another example, if the terminal velocity of the test canister 526 is 20 m/s, then the length of the safety runway would be about four times greater, and the reduced canister capacity would be increased by approximately four times. Such estimates may be adjusted and determined experimentally by dropping one or more test canisters 526 into a drillhole.

As shown and described with reference to FIG. 5, the hazardous material storage repository 500 includes a horizontal drillhole portion 110 that is inclined upward toward the terranean surface 102 (e.g., thereby causing the drillhole 104 to resemble a "j-" or "plumber's" trap). If a part of the horizontal portion 110 is tilted upward, then the stopping distance may be shorter, since the test canister 526 will be slowed by gravity as well as by friction. For example, if the terminal velocity is 10 m/s, then gravity alone may stop the canister with a 5 meter rise. In some aspects, the inclined part of the horizontal portion 110 (and also the transition from the curved portion 108 of the drillhole 104 to the inclined part of the horizontal portion 110) may act along with a hydraulic resistance and frictional force on the test canister 526 to reduce a length of the safety runway 502.

In some aspects, a terminal velocity of the test canister 526 may decrease as soon as it enters the curved portion of the directional drillhole. For example, gravity may no longer act on the canister in the direction of motion (i.e., vertically downward), which reduces a gravitational force that is moving the canister 526 through the drillhole. When the canister enters the curved portion, the canister may be directed about 30° from horizontal, and therefore, not vertically downward. The force of gravity may be reduced by about one-half, and the terminal velocity may be reduced by about 30%. When the terminal velocity is reduced by 30%, then the length of the safety runway is reduced, in turn, by 50%. So the slowing of the canister 526 in the curved portion of the drillhole can result in a significant reduction in the length of the safety runway.

In some aspects, other techniques may be utilized to shorten a length of the safety runway 502. For example, a surface of the canister 126 (or a casing in the drillhole 104) could be purposefully roughened to increase the coefficient of friction, k; such roughening could also affect the flow of fluids between the canister 126 and the casing (e.g., casing 122) in such a way as to increase the hydrodynamic retarding force. However, in some circumstances, such roughening could decrease the hydrodynamic retarding force by increasing turbulence as well.

In some aspects, a canister capacity of the hazardous material storage repository 500 is determined by a number of hazardous material canisters 126 that can be emplaced within the storage area 504. Thus, the horizontal portion 110 may include the storage area 504 (e.g., defined by a volume in which the canisters 126 are emplaced) and the safety runway 502 (e.g., defined by a volume in which no canisters 126 are emplaced). In some aspects, the safety runway portion is located at or near a location of the drillhole in which a curved portion meets the horizontal portion (e.g., near a "heel" of the directional drillhole) while the storage area is located near a "toe" of the directional drillhole (as shown in FIG. 5). In some aspects, a length of the safety runway portion may be determined based at least in part on an estimated terminal velocity of the hazardous waste canister in the drillhole, a friction coefficient between the canister and the drillhole (or a casing in the drillhole), and, in some cases, an inclination deviation from horizontal of at least a part of the horizontal portion of the drillhole. In some aspects, a length of the safety runway portion may be determined based at least in part on a recorded terminal velocity of a test hazardous waste canister in the drillhole, a friction coefficient between the test canister and the drillhole (or a casing in the drillhole), and, in some cases, an inclination deviation from horizontal of at least a part of the horizontal portion of the drillhole. In some aspects, a length of the safety runway portion may be determined based at least in part on a recorded stopping location of a test canister that is allowed to free fall within the drillhole, with such a stopping location being a particular distance (i.e., the safety runway distance) within the horizontal portion of the drillhole from the curved portion of the drillhole.

In some aspects, a directional drillhole formed to include the storage area for the storage (or disposal) of canisters that enclose nuclear waste as well as the safety runway may allow for a rapid delivery of multiple canisters into the repository. For example, the safety runway may reduce or eliminate the danger of damage to one or more canisters due to a free falling canister within the drillhole. Thus, an initial hazardous waste canister (or set of canisters) may be emplaced into the storage area of the horizontal portion of the drillhole by releasing the canister(s) from the surface and allowing a quick descent at terminal velocity through much of the drillhole. The initial canister or set of canisters would then come to rest in the horizontal portion of the drillhole.

In some aspects of the aforementioned rapid delivery process, a downhole tractor 530 (with power source) may be attached to a canister (or a canister within a set of canisters). The downhole tractor 530 may extend its wheels to make contact with the walls of the drillhole (or casing in the drillhole) only when the canister has come to rest. Alternatively, the tractor wheels may be extended during free fall of the canister(s), and the resistance between the tractor wheels and the drillhole (or casing) may reduce the velocity of the dropped canister(s).

Once the canister (or canisters) has come to rest, the tractor 530 would push or pull the canister into a desired position within the hazardous waste repository. For example, a canister that weighs about 1-ton may require a pushing force from the downhole tractor 530 of about 1000 Newtons. The energy to push the canister for a distance of 1 km could be supplied by a small battery weighing less than 2 kg, such as a 1.5 kg Lithium-ion battery.

The downhole tractor 530 could be left in place, or it could be programmed to move back to the access hole. In an example implementation, the downhole tractor 530 would then be retrieved to the surface. In other example implementations, the downhole tractor 530 would use the wheels in contact with the drillhole (or the casing) to crawl upward and out of the hole. For a 10 kg tractor, including battery, the additional energy required to climb out would be about 30 kWh, much less than the energy to push the canister one kilometer. In some aspects, the downhole tractor 530 could be attached to a communications cable that would indicate its location at all times. This communications cable would be light in weight, and it would be spun out so that there would be no force on it while the canister falls.

In some aspects of the present disclosure in which a safety runway length is determined through test canister 526 drops into the drillhole, after a first test canister 526 is dropped and retrieved, then a set of test canisters 526 is dropped into the drillhole. The set of test canisters 526 may be connected such as railroad cars are connected in a string of cars. The second set of test canisters 526 may be designed (by increased mass and length) to slide deeper into the disposal region. After this test is done, and the set of test canisters 526 is removed (or left in place), sets of canisters 126 containing hazardous material can be dropped into the drillhole and carried by their velocity into more distant parts of the storage area. The distance they travel would be determined by their terminal velocity, which in turn is dependent on their mass, size, shape, and coefficient of friction.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A first example implementation according to the present disclosure includes a hazardous material storage system that includes a drillhole extending into the Earth and including an entry at least proximate a terranean surface. The drillhole includes a substantially vertical portion, a curved portion, and a horizontal portion that includes a hazardous waste repository formed within a first portion of the horizontal portion of the drillhole, the hazardous waste repository vertically isolated, by a rock formation, from a subterranean zone that includes mobile water, and a safety runway formed within a second portion of the horizontal portion exclusive of the hazardous waste repository and adjacent the curved portion, the safety runway defined by a particular length. The system further includes at least one hazardous waste canister positioned in the hazardous waste repository. The canister is sized to fit from the drillhole entry through the vertical, the curved, and the horizontal portions of the drillhole, and into the hazardous waste repository. The hazardous waste canister includes an inner cavity sized to enclose hazardous material.

In an aspect combinable with the first example implementation, the hazardous waste includes nuclear waste.

In another aspect combinable with any of the previous aspects of the first example implementation, the nuclear waste includes at least one of spent nuclear fuel or high level radioactive waste.

In another aspect combinable with any of the previous aspects of the first example implementation, the particular length is determined based at least in part on a travel distance of the hazardous waste canister or a test canister into the horizontal portion from the vertical portion and through the curved portion in a free fall event.

In another aspect combinable with any of the previous aspects of the first example implementation, the travel distance is based at least in part on a terminal velocity of the hazardous waste canister or the test canister during the free fall event and a coefficient of friction between the hazardous waste canister or the test canister and the drillhole.

Another aspect combinable with any of the previous aspects of the first example implementation further includes an inclined portion of the drillhole coupled between the curved portion and the horizontal portion.

In another aspect combinable with any of the previous aspects of the first example implementation, the particular length is determined based at least in part on a travel distance of the hazardous waste canister or a test canister into the horizontal portion from the vertical portion and through the curved and inclined portions in a free fall event.

In another aspect combinable with any of the previous aspects of the first example implementation, the travel distance is based at least in part on a terminal velocity of the hazardous waste canister or the test canister during the free fall event, a coefficient of friction between the hazardous waste canister or the test canister and the drillhole, and an angle of inclination of the inclined portion.

In another aspect combinable with any of the previous aspects of the first example implementation, the inclined portion is angled toward the terranean surface from the curved portion.

In another aspect combinable with any of the previous aspects of the first example implementation, the at least one hazardous waste canister is positioned exclusively in the hazardous waste repository and externally to the safety runway.

In another aspect combinable with any of the previous aspects of the first example implementation, the at least one hazardous waste canister includes a plurality of hazardous waste canisters.

In another aspect combinable with any of the previous aspects of the first example implementation, each of the plurality of hazardous waste canisters is positioned exclusively in the hazardous waste repository and externally to the safety runway.

Another aspect combinable with any of the previous aspects of the first example implementation further includes a seal positioned in the drillhole that isolates the hazardous waste repository from the entry of the drillhole.

A second example implementation according to the present disclosure includes a method for storing hazardous waste that includes moving a hazardous waste canister through an entry of a drillhole that extends into a terranean surface. The entry is at least proximate the terranean surface, and the hazardous waste canister includes an inner cavity that encloses hazardous waste. The method further includes moving the hazardous waste canister through a vertical portion of the drillhole and through a curved portion of the drillhole; moving the hazardous waste canister from the curved portion through a first part of a horizontal portion of the drillhole that includes a safety runway defined by a particular length; and moving the hazardous waste canister from the first part of the horizontal portion of the drillhole into a second part of the horizontal portion of the drillhole that includes a hazardous waste repository. The hazardous waste canister is sized to fit from the drillhole entry through the vertical, the curved, and the horizontal portions of the drillhole. The hazardous waste repository is vertically isolated, by a rock formation, from a subterranean zone that includes mobile water.

In an aspect combinable with the second example implementation, the hazardous waste includes nuclear waste.

In another aspect combinable with any of the previous aspects of the second example implementation, the nuclear waste includes at least one of spent nuclear fuel or high level radioactive waste.

In another aspect combinable with any of the previous aspects of the second example implementation, the particular length is determined based at least in part on a travel distance of the hazardous waste canister or a test canister into the horizontal portion from the vertical portion and through the curved portion in a free fall event.

In another aspect combinable with any of the previous aspects of the second example implementation, the travel distance is based at least in part on a terminal velocity of the hazardous waste canister or the test canister during the free fall event and a coefficient of friction between the hazardous waste canister or the test canister and the drillhole.

Another aspect combinable with any of the previous aspects of the second example implementation further includes an inclined portion of the drillhole coupled between the curved portion and the horizontal portion.

In another aspect combinable with any of the previous aspects of the second example implementation, the particular length is determined based at least in part on a travel distance of the hazardous waste canister or a test canister into the horizontal portion from the vertical portion and through the curved and inclined portions in a free fall event.

In another aspect combinable with any of the previous aspects of the second example implementation, the travel distance is based at least in part on a terminal velocity of the hazardous waste canister or the test canister during the free fall event, a coefficient of friction between the hazardous waste canister or the test canister and the drillhole, and an angle of inclination of the inclined portion.

In another aspect combinable with any of the previous aspects of the second example implementation, the inclined portion is angled toward the terranean surface from the curved portion.

In another aspect combinable with any of the previous aspects of the second example implementation, the at least one hazardous waste canister is positioned exclusively in the hazardous waste repository and externally to the safety runway.

In another aspect combinable with any of the previous aspects of the second example implementation, the at least one hazardous waste canister includes a plurality of hazardous waste canisters.

In another aspect combinable with any of the previous aspects of the second example implementation, each of the plurality of hazardous waste canisters is positioned exclusively in the hazardous waste repository and externally to the safety runway.

Another aspect combinable with any of the previous aspects of the second example implementation further includes positioning a seal in the drillhole that isolates the hazardous waste repository from the entry of the drillhole.

A third example implementation according to the present disclosure includes a nuclear waste canister that includes a housing that includes a closed end and an open end opposite the closed end. The housing defines an inner volume sized to hold at least one nuclear waste portion. The housing is configured to store nuclear waste in a human-unoccupiable directional drillhole. The canister includes a first lid attachable to the housing between the closed end and the open end to create a first seal of the inner volume; and a second lid attachable to the housing at or near the open end to create a second seal of the inner volume.

In an aspect combinable with the third example implementation, the nuclear waste portion includes a spent nuclear fuel assembly.

In another aspect combinable with any of the previous aspects of the third example implementation, the outer housing includes a corrosion resistant alloy.

In another aspect combinable with any of the previous aspects of the third example implementation, the corrosion resistant alloy includes CRA 625.

In another aspect combinable with any of the previous aspects of the third example implementation, the first lid is configured to mechanically attach to the housing.

In another aspect combinable with any of the previous aspects of the third example implementation, the first lid is configured to threadingly attach to the housing.

In another aspect combinable with any of the previous aspects of the third example implementation, the housing includes an inner surface that includes a threaded portion between the open end and the closed end.

In another aspect combinable with any of the previous aspects of the third example implementation, the inner surface includes a smooth portion between the closed end and the threaded portion.

In another aspect combinable with any of the previous aspects of the third example implementation, the inner volume includes a first cross-sectional dimension at the smooth portion of the inner surface and a second cross-sectional dimension greater than the first cross-sectional dimension at the threaded portion of the inner surface.

Another aspect combinable with any of the previous aspects of the third example implementation further includes a gasket positioned between a portion of the housing and the first lid.

In another aspect combinable with any of the previous aspects of the third example implementation, the gasket includes a metal gasket.

In another aspect combinable with any of the previous aspects of the third example implementation, the second lid is attachable to the housing at the open end.

In another aspect combinable with any of the previous aspects of the third example implementation, the second lid is attachable to the housing at or near the open end with a weld.

In another aspect combinable with any of the previous aspects of the third example implementation, the weld includes a spin weld.

In another aspect combinable with any of the previous aspects of the third example implementation, the first lid is attachable to the housing within a hot cell, and the second lid is attachable to the housing outside of the hot cell.

A fourth example implementation according to the present disclosure includes a method for containing nuclear waste that includes placing at least one nuclear waste portion into an inner volume of a housing of a nuclear waste canister. The housing includes a closed end and an open end opposite the closed end. The housing is configured to store nuclear waste in a human-unoccupiable directional drillhole. The method further includes attaching a first lid to the housing between the closed end and the open end to create a first seal of the inner volume; and attaching a second lid to the housing at or near the open end to create a second seal of the inner volume.

In an aspect combinable with the fourth example implementation, the nuclear waste portion includes a spent nuclear fuel assembly.

In another aspect combinable with any of the previous aspects of the fourth example implementation, the outer housing includes a corrosion resistant alloy.

In another aspect combinable with any of the previous aspects of the fourth example implementation, the corrosion resistant alloy includes CRA 625.

In another aspect combinable with any of the previous aspects of the fourth example implementation, attaching the first lid includes mechanically attaching the first lid to the housing.

In another aspect combinable with any of the previous aspects of the fourth example implementation, mechanically attaching the first lid includes threadingly attaching the first lid to the housing.

In another aspect combinable with any of the previous aspects of the fourth example implementation, threadingly attaching the first lid to the housing includes screwing the first lid to an inner surface that includes a threaded portion between the open end and the closed end.

In another aspect combinable with any of the previous aspects of the fourth example implementation, the inner surface includes a smooth portion between the closed end and the threaded portion.

In another aspect combinable with any of the previous aspects of the fourth example implementation, the inner volume includes a first cross-sectional dimension at the smooth portion of the inner surface and a second cross-sectional dimension greater than the first cross-sectional dimension at the threaded portion of the inner surface.

Another aspect combinable with any of the previous aspects of the fourth example implementation further includes a gasket positioned between a portion of the housing and the first lid.

In another aspect combinable with any of the previous aspects of the fourth example implementation, the gasket includes a metal gasket.

In another aspect combinable with any of the previous aspects of the fourth example implementation, attaching the second lid to the housing at or near the open end includes attaching the second lid to the housing at the open end.

In another aspect combinable with any of the previous aspects of the fourth example implementation, attaching the second lid includes welding the second lid to the housing at or near the open end.

In another aspect combinable with any of the previous aspects of the fourth example implementation, welding the second lid includes spin welding the second lid to the housing.

In another aspect combinable with any of the previous aspects of the fourth example implementation, the step of attaching the first lid occurs within a hot cell, and the step of attaching the second lid occurs outside of the hot cell.

A fifth example implementation according to the present disclosure includes a nuclear waste disposal system that includes a nuclear waste canister including a housing that defines an interior volume sized to enclose nuclear waste. The nuclear waste canister is configured to store the nuclear waste in a human-unoccupiable directional drillhole in a subterranean formation beneath a terranean surface. The system further includes a free-fall limiting device mounted on the nuclear waste canister configured to slow a velocity of the canister during free-fall movement of the canister in the drillhole.

In an aspect combinable with the fifth example implementation, the nuclear waste includes spent nuclear fuel.

In another aspect combinable with any of the previous aspects of the fifth example implementation, the spent nuclear fuel includes at least one spent nuclear fuel assembly.

In another aspect combinable with any of the previous aspects of the fifth example implementation, the free-fall limiting device includes a centralizer mounted on the nuclear waste canister.

In another aspect combinable with any of the previous aspects of the fifth example implementation, the centralizer includes a plurality of expandable arms configured to adjust radially away from the housing to contact the drillhole during free-fall movement of the canister in the drillhole.

In another aspect combinable with any of the previous aspects of the fifth example implementation, the plurality of expandable arms are configured to adjust radially away from the housing based at least in part on a fluid force acting on the arms during free-fall movement of the canister in the drillhole.

Another aspect combinable with any of the previous aspects of the fifth example implementation further includes a disc mounted on a downhole end of the canister.

In another aspect combinable with any of the previous aspects of the fifth example implementation, the disc is configured to increase a fluid force acting on the arms during free-fall movement of the canister in the drillhole.

In another aspect combinable with any of the previous aspects of the fifth example implementation, the free-fall limiting device includes one or more parachute arms mounted on a downhole end of the canister.

In another aspect combinable with any of the previous aspects of the fifth example implementation, the parachute arms are configured to increase a fluid force acting on the arms during free-fall movement of the canister in the drillhole.

In another aspect combinable with any of the previous aspects of the fifth example implementation, the free-fall limiting device includes a foam member mounted on the canister.

In another aspect combinable with any of the previous aspects of the fifth example implementation, the foam member is configured to increase a fluid force acting on the foam member during free-fall movement of the canister in the drillhole.

Another aspect combinable with any of the previous aspects of the fifth example implementation further includes at least one impact absorber mounted on the canister.

In another aspect combinable with any of the previous aspects of the fifth example implementation, the impact absorber is mounted on a downhole end of the canister.

A sixth example implementation according to the present disclosure includes a method for impeding a free-falling nuclear waste canister that includes moving a nuclear waste canister through a directional drillhole from a terranean surface toward a subterranean zone on a cable, the nuclear waste canister configured to store nuclear waste; and based on the nuclear waste canister experiencing a free-fall event upon being detached from the cable, limiting a free-fall velocity of the canister in the drillhole with a free-fall limiting device mounted on the nuclear waste canister.

In an aspect combinable with the sixth example implementation, the nuclear waste includes spent nuclear fuel.

In another aspect combinable with any of the previous aspects of the sixth example implementation, the spent nuclear fuel includes at least one spent nuclear fuel assembly.

In another aspect combinable with any of the previous aspects of the sixth example implementation, the free-fall limiting device includes a centralizer mounted on the nuclear waste canister.

In another aspect combinable with any of the previous aspects of the sixth example implementation, limiting the free-fall velocity of the canister in the drillhole includes radially adjusting a plurality of expandable arms on the centralizer to contact the drillhole during free-fall movement of the canister in the drillhole.

In another aspect combinable with any of the previous aspects of the sixth example implementation, the plurality of expandable arms are configured to adjust radially away from the housing based at least in part on a fluid force acting on the arms during free-fall movement of the canister in the drillhole.

Another aspect combinable with any of the previous aspects of the sixth example implementation further includes a disc mounted on a downhole end of the canister.

In another aspect combinable with any of the previous aspects of the sixth example implementation, the disc is configured to increase a fluid force acting on the arms during free-fall movement of the canister in the drillhole.

In another aspect combinable with any of the previous aspects of the sixth example implementation, the free-fall limiting device includes one or more parachute arms mounted on a downhole end of the canister.

In another aspect combinable with any of the previous aspects of the sixth example implementation, limiting the free-fall velocity of the canister in the drillhole includes increasing a fluid force acting on the arms during free-fall movement of the canister in the drillhole.

In another aspect combinable with any of the previous aspects of the sixth example implementation, the free-fall limiting device includes a foam member mounted on the canister.

In another aspect combinable with any of the previous aspects of the sixth example implementation, limiting the free-fall velocity of the canister in the drillhole includes increasing a fluid force acting on the foam member during free-fall movement of the canister in the drillhole.

Another aspect combinable with any of the previous aspects of the sixth example implementation further includes at least one impact absorber mounted on the canister.

In another aspect combinable with any of the previous aspects of the sixth example implementation, the impact absorber is mounted on a downhole end of the canister.

A number of implementations have been described. Nevertheless, it will be understood that various modifications may be made without departing from the spirit and scope of the disclosure. For example, while many example implementations of a hazardous material canister according to the present disclosure include a cross-section that is circular or oval, other shapes are contemplated, such as square or rectangular. Also, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A nuclear waste canister, comprising:
   a housing that at least partially defines an inner volume sized to enclose a plurality of nuclear waste portions and configured to store the nuclear waste portions in a hazardous waste repository of a directional drillhole formed in a subterranean formation;
   a solid or semi-solid granular material enclosed in the inner volume of the housing that at least substantially fills voids within the inner volume and between the plurality of nuclear waste portions; and
   a friction brake mounted to an end of the housing.

2. The nuclear waste canister of claim 1, wherein the nuclear waste portions comprise a plurality of spent nuclear fuel (SNF) rods of an SNF assembly.

3. The nuclear waste canister of claim 2, wherein the inner volume is sized to store a single SNF assembly.

4. The nuclear waste canister of claim 1, wherein the solid or semi-solid granular material comprises a solid powder.

5. The nuclear waste canister of claim 4, wherein the solid powder comprises silicon-dioxide.

6. The nuclear waste canister of claim 1, wherein the solid or semi-solid granular material comprises a neutron-absorbing material.

7. The nuclear waste canister of claim 1, further comprising an impact absorber positioned within the inner volume or on an exterior surface of the housing.

8. The nuclear waste canister of claim 7, wherein the impact absorber comprises a crushable member or spring member.

9. The nuclear waste canister of claim 7, wherein the impact absorber comprises a corrosion-resistant material.

10. The nuclear waste canister of claim 1, wherein the friction brake is mounted to the housing with a pivotable or rotatable connection.

11. The nuclear waste canister of claim 1, wherein the end of the housing comprises a downhole end of the housing.

12. The nuclear waste canister of claim 1, wherein the friction brake comprises a surface configured to contact a casing installed in the directional drillhole.

13. A method for storing nuclear waste, comprising:
    placing a plurality of nuclear waste portions into an inner volume of a housing of a nuclear waste canister configured to store the nuclear waste portions in a hazardous waste repository of a directional drillhole formed in a subterranean formation, wherein the nuclear waste canister comprises a friction brake mounted to an end of the housing;
    substantially filling voids within the inner volume and between the plurality of nuclear waste portions with a solid or semi-solid granular material; and
    sealing the inner volume of the nuclear waste canister to enclose the plurality of nuclear waste portions and the solid or semi-solid granular material.

14. The method of claim 13, wherein the nuclear waste portions comprise a plurality of spent nuclear fuel (SNF) rods of an SNF assembly.

15. The method of claim 14, wherein the inner volume is sized to store a single SNF assembly.

16. The method of claim 13, wherein the solid or semi-solid granular material comprises a solid powder.

17. The method of claim 16, wherein the solid powder comprises silicon-dioxide.

18. The method of claim 13, wherein the solid or semi-solid granular material comprises a neutron-absorbing material.

19. The method of claim 13, wherein the nuclear waste canister further comprises an impact absorber positioned within the inner volume or on an exterior surface of the housing.

20. The method of claim 19, wherein the impact absorber comprises a crushable member or spring member.

21. The method of claim 19, wherein the impact absorber comprises a corrosion-resistant material.

22. The method of claim 13, wherein the friction brake is mounted to the housing with a pivotable or rotatable connection.

23. The method of claim 13, wherein the end of the housing comprises a downhole end of the housing.

24. The method of claim 13, wherein the friction brake comprises a surface configured to contact a casing installed in the directional drillhole.

25. The method of claim 13, further comprising moving the sealed nuclear waste canister into the hazardous waste repository of the directional drillhole.

26. The method of claim 25, further comprising mitigating an impact of the sealed nuclear waste canister during a free fall event during movement of the sealed nuclear waste canister through the directional drillhole.

27. The method of claim 26, wherein mitigating the impact of the sealed nuclear waste canister during the free fall event during movement of the sealed nuclear waste canister through the directional drillhole comprises contacting a portion of the directional drillhole or a wellbore fluid with the friction brake during the free fall event.

28. The method of claim 27, wherein contacting the portion of the directional drillhole or the wellbore fluid with the friction brake during the free fall event comprises contacting a casing positioned in the directional drillhole with the friction brake during the free fall event.

* * * * *